United States Patent
Uechi et al.

(10) Patent No.: US 10,927,713 B2
(45) Date of Patent: Feb. 23, 2021

(54) INTAKE AIR COOLING METHOD, INTAKE AIR COOLING DEVICE EXECUTING SAID METHOD, AND WASTE HEAT RECOVERY FACILITY AND GAS TURBINE PLANT EACH COMPRISING SAID INTAKE AIR COOLING DEVICE

(71) Applicant: MITSUBISHI HEAVY INDUSTRIES, LTD., Tokyo (JP)

(72) Inventors: Hideyuki Uechi, Tokyo (JP); Eisaku Ito, Tokyo (JP); Hideaki Sugishita, Tokyo (JP); Naoki Hisada, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 644 days.

(21) Appl. No.: 15/554,523

(22) PCT Filed: Mar. 10, 2016

(86) PCT No.: PCT/JP2016/057559
§ 371 (c)(1),
(2) Date: Aug. 30, 2017

(87) PCT Pub. No.: WO2016/148008
PCT Pub. Date: Sep. 22, 2016

(65) Prior Publication Data
US 2018/0045080 A1    Feb. 15, 2018

(30) Foreign Application Priority Data
Mar. 17, 2015    (JP) .............................. JP2015-053283

(51) Int. Cl.
*F01K 23/10* (2006.01)
*F01K 25/10* (2006.01)
(Continued)

(52) U.S. Cl.
CPC .............. *F01K 23/10* (2013.01); *F01K 25/10* (2013.01); *F02C 6/18* (2013.01); *F02C 7/143* (2013.01);
(Continued)

(58) Field of Classification Search
CPC .. F01K 23/10–108; F01K 25/10; F25B 27/02; Y02B 30/52; F02C 7/143;
(Continued)

(56) References Cited

U.S. PATENT DOCUMENTS 3,796,045 A * 3/1974 Foster-Pegg ............ F01K 23/10
60/772
5,934,065 A * 8/1999 Bronicki ................ F01K 23/103
60/39.181

(Continued)

FOREIGN PATENT DOCUMENTS

| JP | 2-78736 | 3/1990 |
| JP | 6-299868 | 10/1994 |

(Continued)

OTHER PUBLICATIONS

International Search Report dated Jun. 14, 2016 in International (PCT) Application No. PCT/JP2016/057559, with English Translation.

(Continued)

*Primary Examiner* — Hoang M Nguyen
(74) *Attorney, Agent, or Firm* — Wenderoth, Lind & Ponack, L.L.P.

(57) ABSTRACT

An intake air cooling device includes a water supply line and a heat pump device. The water supply line is configured to send water to a waste heat recovery boiler which is configured to generate steam using heat of an exhaust gas from a gas turbine. The heat pump device is configured to transfer heat of air suctioned by the gas turbine to water flowing (Continued)

through the water supply line and thereby cool the air while heating the water.

18 Claims, 11 Drawing Sheets

(51) Int. Cl.
    *F02C 6/18*     (2006.01)
    *F02C 7/143*     (2006.01)
    *F25B 27/02*     (2006.01)
    *F02C 7/16*     (2006.01)
    *F02G 5/04*     (2006.01)

(52) U.S. Cl.
    CPC ............... *F02C 7/16* (2013.01); *F25B 27/02* (2013.01); *F02G 5/04* (2013.01); *Y02A 30/274* (2018.01); *Y02B 30/52* (2013.01); *Y02P 80/15* (2015.11)

(58) Field of Classification Search
    CPC ... F02C 7/16; F02C 6/18; Y02P 80/15; Y02A 30/274; F02G 5/04; Y02T 10/12
    USPC ....................... 60/39.182, 653, 670, 665, 660
    See application file for complete search history.

(56) References Cited

U.S. PATENT DOCUMENTS

| | | | | |
|---|---|---|---|---|
| 6,244,039 | B1 * | 6/2001 | Sugishita | F01K 23/106 60/39.182 |
| 6,698,182 | B2 * | 3/2004 | Sonoda | F01K 23/10 60/39.182 |
| 2001/0042381 | A1 | 11/2001 | Dodo et al. | |
| 2006/0130482 | A1 * | 6/2006 | Chino | F01K 17/005 60/670 |
| 2010/0293973 | A1 * | 11/2010 | Erickson | F25B 27/02 62/101 |
| 2017/0114672 | A1 * | 4/2017 | Watkins | B01D 3/065 |

FOREIGN PATENT DOCUMENTS

| | | | | |
|---|---|---|---|---|
| JP | 8-158814 | | 6/1996 | |
| JP | 9-133027 | | 5/1997 | |
| JP | 11-304274 | | 11/1999 | |
| JP | 2000282895 | A * | 10/2000 | |
| JP | 2001-50012 | | 2/2001 | |
| JP | 2001-254632 | | 9/2001 | |
| JP | 2003-206752 | | 7/2003 | |
| JP | 2003193910 | A * | 7/2003 | |
| JP | 3464267 | | 11/2003 | |
| JP | 2005315127 | A * | 11/2005 | |
| JP | 2007-64049 | | 3/2007 | |
| JP | 2008-45807 | | 2/2008 | |
| JP | 2008-241205 | | 10/2008 | |
| JP | 2012-62825 | | 3/2012 | |
| JP | 2012062825 | A * | 3/2012 | |
| WO | WO-2006068832 | A1 * | 6/2006 | ............ F02C 7/18 |
| WO | WO-2014118384 | A1 * | 8/2014 | ............ F25B 7/00 |
| WO | WO-2015064193 | A1 * | 5/2015 | ............ F02C 3/30 |

OTHER PUBLICATIONS

Written Opinion of the International Searching Authority dated Jun. 14, 2016 in International (PCT) Application No. PCT/JP2016/057559, with English Translation.

\* cited by examiner

INTAKE AIR COOLING METHOD, INTAKE AIR COOLING DEVICE EXECUTING SAID METHOD, AND WASTE HEAT RECOVERY FACILITY AND GAS TURBINE PLANT EACH COMPRISING SAID INTAKE AIR COOLING DEVICE

CROSS-REFERENCE TO RELATED APPLICATION

Priority is claimed from Japanese Patent Application No. 2015-053283, filed Mar. 17, 2015, the content of which is incorporated herein by reference.

TECHNICAL FIELD

The present invention relates to an intake air cooling method for cooling air suctioned by a gas turbine, an intake air cooling device for executing the method, and a waste heat recovery facility and a gas turbine plant which include the same.

BACKGROUND ART

A gas turbine includes a compressor which compresses air, a combustor which burns fuel in the air compressed by the compressor and generates a combustion gas, and a turbine driven by the combustion gas. A waste heat recovery boiler ay be connected to the gas turbine to effectively utilize heat of an exhaust gas exhausted from the turbine.

In the gas turbine, as a mass flow rate of the gas flowing in the turbine increases, output of the gas turbine increases. Therefore, for example, in the technology disclosed in Japanese Unexamined Patent Application, First Publication No. H06-299868, a mass flow rate of air suctioned by a compressor increases when the air suctioned by the compressor is cooled. In this technology, heat is exchanged between the air suctioned by the compressor and an intake air cooling medium cooled by a refrigerating machine and cools the air. In this technology, water is heated with heat of the exhaust gas exhausted from the turbine and the refrigerating machine is driven using heat of the heated water.

SUMMARY OF INVENTION

Technical Problem

In the technology disclosed in Japanese Unexamined Patent Application, First Publication No. H06-299868, cooling water is introduced into a refrigerating machine and this cooling water is discharged. Therefore, in this technology, it is considered that heat is exchanged between an intake air cooling medium and the cooling water and cools the intake air cooling medium while heating the cooling water. That is, in this technology, it is considered that heat of air suctioned by a compressor is transferred to the cooling water via the intake air cooling medium, and heat of the air suctioned by the compressor is discharged to the outside together with the cooling water.

An object of the present invention is to provide an intake air cooling method capable of cooling air suctioned by a gas turbine while effectively utilizing heat obtained by cooling the air, an intake air cooling device for executing the method, and a waste heat recovery facility and a gas turbine plant which include the same.

Solution to Problem

An intake air cooling device as a first aspect according to the invention for achieving above-described object includes a water supply line which sends water to a waste heat recovery boiler which converts the water into steam using heat of an exhaust gas exhausted from a gas turbine, and a heat pump device which transfers heat of air suctioned by the gas turbine to water flowing through the water supply line and thereby cools the air while heating the water.

In the intake air cooling device, air suctioned by the gas turbine can be cooled and water sent to the waste heat recovery boiler can be preheated with heat obtained by cooling the air. Therefore, in the intake air cooling device, it is possible to effectively utilize the heat obtained by cooling the air suctioned by the gas turbine.

In the intake air cooling device as a second aspect according to the invention for achieving above-described object, the intake air cooling device of the first aspect, wherein the heat pump device may include an intake air cooler which exchanges heat between the air and an intake air cooling medium and thereby cools the air while heating the intake air cooling medium, an intermediate heat exchanger which exchanges heat between the intake air cooling medium heated by the intake air cooler and an intermediate medium and thereby cools the intake air cooling medium while heating the intermediate medium, and a heat pump which transfers heat of the intermediate medium heated by the intermediate heat exchanger to water flowing through the water supply line and thereby cools the intermediate medium while heating the water.

The intake air cooling device as a third aspect according to the invention for achieving above-described object may include, in the intake air cooling device of the first or second aspect, a supply water temperature adjuster, which takes heat away from water flowing through a preheated water supply line on the waste heat recovery boiler side with respect to the heat pump device, in the water supply line, and a water supply temperature adjusting line which guides water flowing through the preheated water supply line to the supply water temperature adjuster and returns the water from which heat has been taken away by the supply water temperature adjuster to any place in the water supply line.

Water sent to an economizer of the waste heat recovery boiler can be preheated by heating the water flowing through the water supply line with the heat pump device. However, when a heating amount of water in the heat pump device is large, it is conceivable that water in the economizer starts to boil before being introduced into an evaporator of the waste heat recovery boiler due to heat exchange between the preheated water and the exhaust gas. In this way, when water starts to boil before being introduced into the evaporator, problems such as an increase in pressure loss or the occurrence of a water hammer phenomenon arise.

In the intake air cooling device, since the supply water temperature adjuster takes heat away from the water flowing in the preheated water supply line, boiling of water in the economizer can be suppressed.

The intake air cooling device as a fourth aspect according to the invention for achieving above-described object may include, in the intake air cooling device of the third aspect, a thermometer which determines a temperature of the water flowing through the preheated water supply line, and a temperature adjusting valve which flows water from the preheated water supply line to the water supply temperature adjusting line when the temperature of the water determined by the thermometer is equal to or higher than a predetermined temperature.

In the intake air cooling device, when a temperature of the water flowing through the preheated water supply line is equal to or higher than a predetermined temperature, the water is sent to the supply water temperature adjuster. Here, the predetermined temperature refers to, for example, a temperature lower than a value obtained by subtracting a temperature rise of the water in the economizer from a saturation temperature at which water boils in the economizer of the waste heat recovery boiler. In the supply water temperature adjuster, as described above, heat of the water from the preheated water supply line is taken away. Therefore, in the intake air cooling device, it is possible to suppress the water flowing through the preheated water supply line from being equal to or higher than the predetermined temperature, and as a result, boiling of water in the economizer can be suppressed.

The intake air cooling device as a fifth aspect according to the invention for achieving above-described object may include, in the intake air cooling device of the first or second aspect, a condensation return line which returns preheated water which is water flowing through a preheated water supply line on the waste heat recovery boiler side with respect to the heat pump device in the water supply line to a steam condenser which returns steam generated by the waste heat recovery boiler to water and sends the water to the water supply line, a thermometer which determines the temperature of the preheated water, and a temperature adjusting valve provided in the condensation return line and configured to flow the preheated water from the preheated water supply line to the steam condenser via the condensation return line when the temperature of the preheated water determined by the thermometer is equal to or higher than a predetermined temperature.

In the intake air cooling device, some of the preheated water flowing in the preheated water supply line is returned to the steam condenser and heat is released into the water in the steam condenser. Therefore, in the intake air cooling device, a temperature rise of the water heated by the heat pump device is suppressed by increasing a flow rate of the water heated by the heat pump device, and thereby boiling of water in the economizer can be suppressed.

The intake air cooling device as a sixth aspect according to the invention for achieving above-described object may include, in the intake air cooling device of any one of the first to fifth aspects, a second heat pump device which heats the water flowing through the preheated water supply line on the waste heat recovery boiler side with respect to a first heat pump device in the water supply line in addition to the first heat pump device which is the heat pump device.

In the intake air cooling device, the water sent to the waste heat recovery boiler can be further heated by the second heat pump device.

In the intake air cooling device as a seventh aspect according to the invention for achieving above-described object, the intake air cooling device of the sixth aspect, wherein the second heat pump device may include a water supply circulation line branched off from the preheated water supply line and configured to return some of the water flowing through the preheated water supply line to a pre-preheating water supply line on a side opposite to the waste heat recovery boiler with respect to the first heat pump device in the water supply line, and a heat pump which transfers heat of water flowing through the water supply circulation line to water flowing on the side of the waste heat recovery boiler relative to a branched-off position of the water supply circulation line in the preheated water supply line and heats the water flowing through the preheated water supply line.

A waste heat recovery facility as an eighth aspect according to the invention for achieving above-described object includes the intake air cooling device of any one of the first to seventh aspects, and the waste heat recovery boiler.

In the waste heat recovery facility as a ninth aspect according to the invention for achieving above-described object, the waste heat recovery facility of the eighth aspect, wherein the waste heat recovery boiler may include a boiler outer frame through which the exhaust gas flows toward a downstream side which is an exhaust port side, one or more evaporators having at least a portion thereof installed in the boiler outer frame and configured to heat water with the exhaust gas and generate steam and an economizer installed on the downstream side of the most downstream evaporator which is an evaporator at the most downstream side among one or more evaporators in the boiler outer frame and configured to heat water introduced from the water supply line and sent to the most downstream evaporator with the exhaust gas.

The waste heat recovery facility as a tenth aspect according to the invention for achieving above-described object may include, in the waste heat recovery facility of the ninth aspect, a low boiling point medium Rankine cycle in which a low boiling point medium circulates repeatedly between condensation and evaporation, wherein the low boiling point medium Rankine cycle includes a heater which exchanges heat between the liquid low boiling point medium and some of the water heated by the economizer to heat the low boiling point medium.

In the waste heat recovery facility, an output and efficiency of the waste heat recovery facility can be increased.

The waste heat recovery facility as an eleventh aspect according to the invention for achieving above-described object may include, in the waste heat recovery facility of the tenth aspect, a hot water line which returns some of the water heated by the economizer to the water supply line, wherein the heater of the low boiling point medium Rankine cycle is connected to the hot water line.

Water sent to the economizer of the waste heat recovery boiler can be preheated by heating water flowing through the water supply line by the heat pump device. However, when a heating amount of water in the heat pump device is large, it is conceivable that water in the economizer of the heat recovery boiler starts to boil before being introduced into an evaporator of the waste heat recovery boiler due to heat exchange between the preheated water and the exhaust gas. In this way, when water starts to boil before being introduced into the evaporator, problems such as an increase in pressure loss or the occurrence of a water hammer phenomenon arise.

In the waste heat recovery facility, since heat is taken away from water flowing through the hot water line by the low boiling point medium Rankine cycle, boiling of water in the economizer can be suppressed.

The waste heat recovery facility as a twelfth aspect according to the invention for achieving above-described object may include, in the waste heat recovery facility in any one of the ninth to eleventh aspects, a waste heat recovery heat exchanger which recovers waste heat from the gas turbine to heat an absorbent liquid heating medium, and an absorbent liquid heating medium line which guides the absorbent liquid heating medium heated by the waste heat recovery heat exchanger to the heat pump device, wherein the heat pump device includes an absorption refrigerating machine having a regenerator which evaporates a medium contained in an absorbent liquid, and the absorbent liquid heating medium line is connected to the absorption refrigerating machine to exchange heat between the absorbent liquid heating medium and the absorbent liquid flowing in the absorption refrigerating machine.

In the waste heat recovery facility, the absorbent liquid flowing in the absorption refrigerating machine is heated with the exhaust heat from the gas turbine. When the absorbent liquid is heated, the medium contained in the absorbent liquid is evaporated and the absorbent liquid which has been diluted with the medium is regenerated into a denser absorbent liquid. Therefore, in the waste heat recovery facility, the consumption of a heat generation medium such as fuel, high temperature water, or high temperature steam can be suppressed when heating the absorbent liquid to regenerate the absorbent liquid.

In the waste heat recovery facility as a thirteenth aspect according to the invention for achieving above-described object, the waste heat recovery facility of the twelfth aspect, wherein the waste heat recovery heat exchanger installed on a downstream side of the economizer in the boiler outer frame may serve as a low-temperature heat exchanger which exchanges heat between the absorbent liquid heating medium and the exhaust gas having passed through the economizer to heat the absorbent liquid heating medium.

In the waste heat recovery facility as a fourteenth aspect according to the invention for achieving above-described object, the waste heat recovery facility of the twelfth aspect, wherein the waste heat recovery heat exchanger may serve as a compressed air cooler which exchanges heat between air compressed by a compressor of the gas turbine and the absorbent liquid heating medium and thereby cools the air while heating the absorbent liquid heating medium.

A gas turbine plant as a fifteenth aspect according to the invention for achieving above-described object includes the waste heat recovery facility according to any one of the eighth aspect to the fourteenth aspect, and the gas turbine.

An intake air cooling method as a sixteenth aspect according to the invention for achieving above-described object includes a water supply process of sending water to a waste heat recovery boiler which converts the water into steam using heat of an exhaust gas exhausted from a gas turbine, and a heat pump cycle execution process of transferring heat of air suctioned by the gas turbine to the water sent to the waste heat recovery boiler in the water supply process and thereby cools the air while heating the water.

In the intake air cooling method, air suctioned by the gas turbine can be cooled and the water sent to the waste heat recovery boiler can be preheated with heat obtained by cooling the air. Therefore, in the intake air cooling method, it is possible to effectively utilize the heat obtained by cooling the air suctioned by the gas turbine.

In the intake air cooling method as a seventeenth aspect according to the invention for achieving above-described object, the intake air cooling method of the sixteenth aspect, wherein a supply water temperature adjusting process of taking heat away from the water heated by execution of the heat pump cycle execution process may be executed to adjust a temperature of the water sent to the waste heat recovery boiler.

By heating water sent to the economizer of the waste heat recovery boiler in the heat pump cycle execution process, the water can be preheated. However, when a heating amount of water in the heat pump cycle execution process is large, it is conceivable that water in the economizer of the waste heat recovery boiler starts to boil before being introduced into an evaporator of the waste heat recovery boiler due to heat exchange between the preheated water and the exhaust gas. In this way, when water starts to boil before being introduced into the evaporator, problems such as an increase in pressure loss or the occurrence of a water hammer phenomenon arise.

In the intake air cooling method, since heat from the water flowing in the preheated water supply line is taken away in the supply water temperature adjusting process, boiling of water in the economizer can be suppressed.

In the intake air cooling method as an eighteenth aspect according to the invention for achieving above-described object, the intake air cooling method of the sixteenth aspect, wherein a condensation return process of returning some of preheated water to a steam condenser which returns steam generated by the waste heat recovery boiler to water and sends the water to the water supply line when a temperature of the preheated water which is the water heated by execution of the heat pump cycle execution process is equal to or higher than a predetermined temperature may be executed.

In the intake air cooling method, some of the preheated water is returned to the steam condenser and heat is released into the water in the steam condenser. Therefore, in the intake air cooling method, a temperature rise of water heated in the heat pump cycle execution process is suppressed by increasing a flow rate of water heated by the heat pump cycle execution process, and thereby boiling of water in the economizer can be suppressed.

In the intake air cooling method as a nineteenth aspect according to the invention for achieving above-described object, the intake air cooling method in any one of the sixteenth to eighteenth aspects, wherein a second heat pump cycle execution process of further heating the water heated by execution of a first heat pump cycle execution process may be executed together with the first heat pump cycle execution process which is the heat pump cycle execution process.

In the intake air cooling method, the water sent to the waste heat recovery boiler can be further heated in the second heat pump cycle execution process.

In the intake air cooling method as an twentieth aspect according to the invention for achieving above-described object, the intake air cooling method in any one of the sixteenth to nineteenth aspects, wherein a Rankine cycle execution process of circulating a low boiling point medium may be executed with a low boiling point medium Rankine cycle, the waste heat recovery boiler may include a boiler outer frame through which the exhaust gas flows toward a downstream side which is an exhaust port side, one or more evaporators having at least a portion thereof installed in the boiler outer frame and configured to heat water with the exhaust gas and generate steam, and an economizer installed on a downstream side of the most downstream evaporator which is an evaporator at the most downstream side among one or more evaporators in the boiler outer frame and configured to heat water sent to the most downstream evaporator using the exhaust gas, and the Rankine cycle execution process may include a heating process of exchanging heat between some of the water heated by the economizer and the liquid low boiling point medium to heat the low boiling point medium.

In the intake air cooling method, an output and efficiency of the waste heat recovery facility including the waste heat recovery boiler can be increased.

In the intake air cooling method as a twenty-first aspect according to the invention for achieving above-described object, the intake air cooling method of the twentieth aspect, wherein a water recovery process of returning water from the economizer cooled by heat exchange with the low boiling point medium in the heating process to the economizer may be executed.

By heating water sent to the economizer of the waste heat recovery boiler in the heat pump cycle execution process, the water can be preheated. However, when a heating amount of water in the heat pump cycle execution process is large, it is conceivable that water in the economizer starts to boil before being introduced into an evaporator of the waste heat recovery boiler due to heat exchange between the preheated water and the exhaust gas. In this way, when water starts to boil before being introduced into the evaporator, problems such as an increase in pressure loss or the occurrence of a water hammer phenomenon arise.

In the intake air cooling method, since heat from the water sent to the economizer is taken away by execution of the Rankine cycle execution process and the water recovery process, boiling of water in the economizer can be suppressed.

In the intake air cooling method as a twenty-second aspect according to invention for achieving above-described object, the intake air cooling method in any one of the sixteenth aspect to twenty-first aspect, wherein a waste heat recovery process of recovering waste heat from the gas turbine to heat an absorbent liquid heating medium may be executed, the heat pump cycle execution process may be executed by an absorption refrigerating machine which includes a regenerator evaporating a medium contained in an absorbent liquid, and the heat pump cycle execution process may include a regeneration process of exchanging heat between the absorbent liquid heating medium and the absorbent liquid flowing in the absorption refrigerating machine and thereby cools the absorbent liquid heating medium while heating the absorbent liquid.

Advantageous Effects of the Invention

According to one aspect of the present invention, while cooling air suctioned by a gas turbine, it is possible to utilize heat obtained by cooling the air.

DESCRIPTION OF EMBODIMENTS

Hereinafter, various embodiments of a gas turbine plant according to the present invention will be described with reference to the drawings.

First Embodiment of Gas Turbine Plant

A first embodiment of the gas turbine plant according to the present invention will be described with reference to FIGS. 1 and 2.

Figure 1:
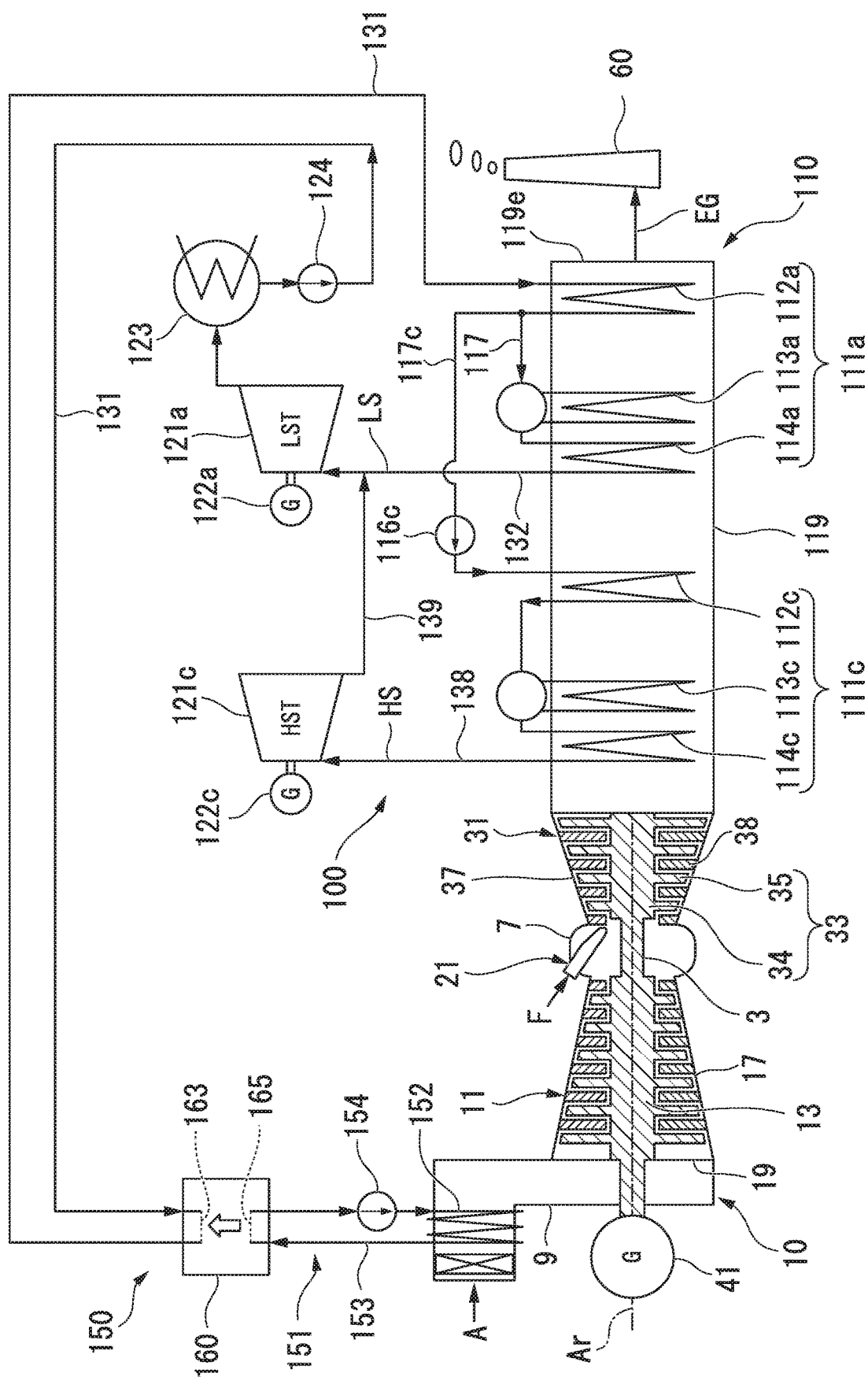
FIG. 1 is a general system diagram of a gas turbine plant in a first embodiment according to the present invention.

As shown in FIG. 1, the gas turbine plant of the present embodiment includes a gas turbine 10, a power generator 41 which generates power by driving the gas turbine 10, a waste heat recovery facility 100 which recovers heat of an exhaust gas EG exhausted from the gas turbine 10, a chimney 60 which releases the exhaust gas EG which has passed through the waste heat recovery facility 100 to the atmosphere.

The gas turbine 10 includes a compressor 11 which compresses air A, an intake air duct 9 which guides air to the compressor 11, a combustor 21 which burns F in the air A compressed by the compressor 11 and generates a combustion gas, a turbine 31 driven by the combustion gas at high temperature and high pressure.

The compressor 11 includes a compressor rotor 13 which rotates about an axis Ar and a compressor casing 17 which rotatably covers the compressor rotor 13. Here, a direction in which the axis Ar extends is designated as an axial direction. Also, one side in the axial direction is designated as an axial direction upstream side and the other side in the axial direction is designated as an axial direction downstream side.

The axial direction upstream side of the compressor casing 17 is open. The opening forms an intake port 19 into which air is suctioned. The intake air duct 9 is installed on the axial direction upstream side of the compressor 11. The intake air duct 9 is connected to the intake port 19 of the compressor casing 17.

The turbine 31 is installed on the axial direction downstream side of the compressor 11. The turbine 31 includes a turbine rotor 33 which rotates about the axis Ar with the combustion gas from the combustor 21 and a turbine casing 37 which rotatably covers the turbine rotor 33. The turbine rotor 33 includes a rotor shaft 34 extending in the axial direction and a plurality of turbine blades 35 fixed to an outer circumference of the rotor shaft 34. A plurality of turbine vanes 38 are fixed to an inner circumferential surface of the turbine casing 37. A combustion gas flow path through which the combustion gas from the combustor 21 passes is formed between the inner circumferential surface of the turbine casing 37 and the outer circumferential surface of the rotor shaft 34.

The turbine rotor 33 and the compressor rotor 13 are connected to each other and integrally rotate about the same axis Ar. The turbine rotor 33 and the compressor rotor 13 form a gas turbine rotor 3. A rotor of the power generator 41 described above is connected to the gas turbine rotor 3. The turbine casing 37 and the compressor casing 17 are connected to each other to form a gas turbine casing 7. The combustor 21 is fixed to the gas turbine casing 7.

The waste heat recovery facility 100 includes a waste heat recovery boiler 110, steam turbines 121a and 121c, power generators 122a and 122c, a steam condenser 123, a water supply pump 124, and an intake air cooling device 150. The waste heat recovery boiler 110 generates steam with heat of the combustion gas which has driven the turbine 31, that is, the exhaust gas EG exhausted from the gas turbine 10. The steam turbines 121a and 121c are driven with steam generated in the waste heat recovery boiler 110. The power generators 122a and 122c generate power by driving of the steam turbines 121a and 121c. The steam condenser 123 returns the steam which has driven the steam turbine 121a to water. The water supply pump 124 returns water in the steam condenser 123 to the waste heat recovery boiler 110. The intake air cooling device 150 cools the air A suctioned by the compressor 11.

The waste heat recovery facility 100 includes a low-pressure steam turbine 121a and a high-pressure steam turbine 121c which are respectively serving as the steam turbines 121a and 121c. The power generators 122a and 122c are respectively connected to the low-pressure steam turbine 121a and the high-pressure steam turbine 121c. Here, although the power generators 122a and 122c are respectively connected to the low-pressure steam turbine 121a and the high-pressure steam turbine 121c, rotors of the low-pressure steam turbine 121a and the high-pressure steam bin 121c may be connected to each other and one power generator may be connected to a total of two steam turbines.

The waste heat recovery boiler 110 includes a boiler outer frame 119, a low-pressure steam generator 111a which generates low-pressure steam LS, and a high-pressure steam generator 111c which generates high-pressure steam HS. Both the low-pressure steam generator 111a and the high-pressure steam generator 111c have at least a part thereof set in the boiler outer frame 119.

The boiler outer frame 119 is connected to an exhaust port of the turbine casing 37 and the chimney 60. Therefore, the combustion gas which has rotated the turbine rotor 33 is introduced into the boiler outer frame 119 from the gas turbine 10 as the exhaust gas EG. The exhaust gas EG passes through the inside of the boiler outer frame 119 and is released to the atmosphere from an exhaust port 119e of the boiler outer frame 119 via the chimney 60. In the present embodiment, an exhaust port side of the boiler outer frame 119 is designated as a downstream side of the flow of the exhaust gas EG and the opposite side is designated as an upstream side.

The low-pressure steam generator 111a is disposed on the downstream side of the high-pressure steam generator 111c. The low-pressure steam generator 111a includes a low-pressure economizer 112a which heats water, a low-pressure evaporator (a most downstream evaporator) 113a which converts the water heated by the low-pressure economizer 112a into steam, and a low-pressure superheater 114a which superheats the steam generated by the low-pressure evaporator 113a and generates the low-pressure steam LS. Both the low-pressure superheater 114a and the low-pressure economizer 112a are installed in the boiler outer frame 119. An evaporation drum which is a part of the low-pressure evaporator 113a is installed outside the boiler outer frame 119. On the other hand, a heat transfer tube which is another part of the low-pressure evaporator 113a is installed in the boiler outer frame 119. Each component constituting the low-pressure steam generator 111a is arranged in the order of the low-pressure superheater 114a, the low-pressure evaporator 113a, and the low-pressure economizer 112a toward the downstream side.

The high-pressure steam generator 111c includes a high-pressure pump 116c which pressurizes the water heated by the low-pressure economizer 112a, a high-pressure economizer 112c which heats the water pressurized by the high-pressure pump 116c, a high-pressure evaporator 113c which converts the water heated by the high-pressure economizer 112c into steam, and a high-pressure superheater 114c which superheats the steam generated in the high-pressure evaporator 113c and generates the high-pressure steam HS. Both the high-pressure superheater 114c and the high-pressure economizer 112c are installed in the boiler outer frame 119. An evaporation drum which is a part of the high-pressure evaporator 113c is installed outside the boiler outer frame 119. On the other hand, a heat transfer tube which is another part of the high-pressure evaporator 113c is installed in the boiler outer frame 119. Also, the high-pressure pump 116c is installed outside the boiler outer frame 119. Each component constituting the high-pressure steam generator 111c is arranged in the order of the high-pressure superheater 114c, the high-pressure evaporator 113c, and the high-pressure economizer 112c toward the downstream side. The low-pressure economizer 112a is connected to a low-pressure water line 117 which guides heated water by the low-pressure economizer 112a to the low-pressure evaporator 113a. The low-pressure water line 117 branches off halfway. The branched line is connected to the high-pressure economizer 112c as a low-pressure water branch line 117c. The high-pressure pump 116c is provided in the low-pressure water branch line 117c.

The steam condenser 123 and the low-pressure economizer 112a of the waste heat recovery boiler 110 are connected by a water supply line 131. The water supply pump 124 described above is provided in the water supply line 131. The low-pressure superheater 114a and a steam inlet of the low-pressure steam turbine 121a are connected by a low-pressure steam line 132 through which the low-pressure steam LS from the low-pressure superheater 114a is sent to the low-pressure steam turbine 121a. A steam outlet of the low-pressure steam turbine 121a and the steam condenser 123 are connected to each other so that the low-pressure steam LS which has driven the low-pressure steam turbine 121a is supplied to the steam condenser 123. The high-pressure superheater 114c and a steam inlet of the high-pressure steam turbine 121c are connected by a high-pressure steam line 138 through which the high-pressure steam HS from the high-pressure superheater 114c is sent to the high-pressure steam turbine 121c. A high-pressure steam recovery line 139 is connected to a steam outlet of the high-pressure steam turbine 121c. The high-pressure steam recovery line 139 joins the low-pressure steam line 132.

Figure 2:
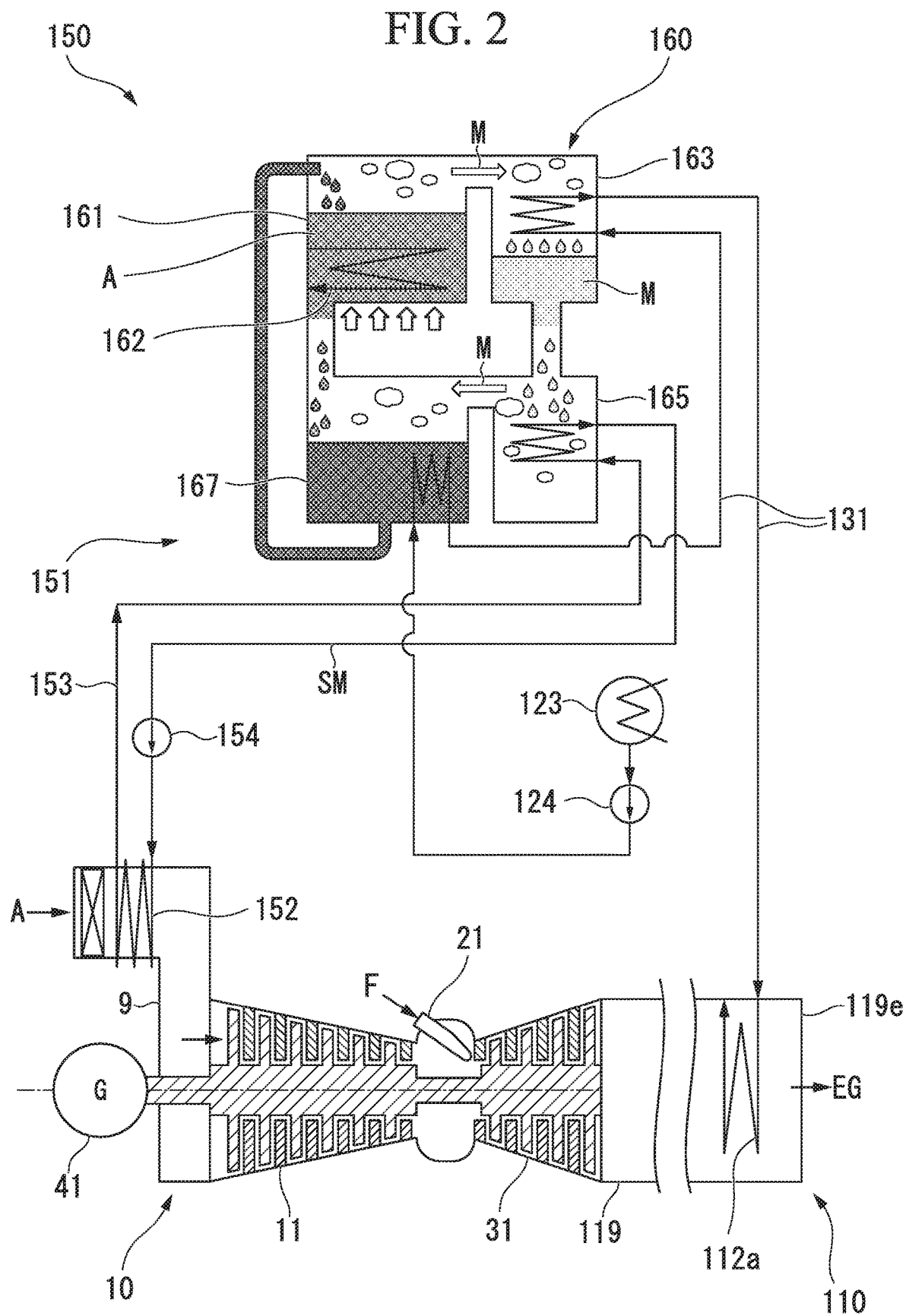
FIG. 2 is a main portion system diagram of a gas turbine plant in the first embodiment according to the present invention.

As shown in FIG. 2, the intake air cooling device 150 includes the water supply line 131 described above and a heat pump device 151. The heat pump device 151 transfers heat of the air A suctioned by the compressor 11 to water flowing through the water supply line 131 and thereby cools the air A while heating the water.

The heat pump device 151 includes a refrigerating machine 160 which is one type of heat pump, an intake air cooler 152 which cools air suctioned by the compressor 11 with an intake air cooling medium SM cooled by the refrigerating machine 160, an intake air cooling medium line 153 which connects the intake air cooler 152 and the refrigerating machine 160, and a circulation pump 154 which circulates the intake air cooling medium SM in the intake air cooling medium line 153.

The refrigerating machine 160 of the present embodiment is an absorption refrigerating machine. The refrigerating machine 160 of the present embodiment includes a regenerator 161 which evaporates a medium M from an absorbent liquid A containing the medium M, a condenser 163 which condenses the gaseous medium M from the regenerator 161, an evaporator 165 which evaporates the liquid medium M from the condenser 163, and an absorber 167 which causes the gaseous medium M from the evaporator 165 to be absorbed by the absorbent liquid A.

In the regenerator 161, the absorbent liquid. A containing the medium M is heated with heat from the outside and the medium M is evaporated from the absorbent liquid A. As a result, an amount of the medium M in the absorbent liquid A decreases. That is, the absorbent liquid A diluted with the medium M is regenerated into a denser absorbent liquid A in the regenerator 161. In order to heat the absorbent liquid A, for example, heat obtained by burning fuel of the gas turbine, heat from a heat source medium such as high temperature water or high temperature steam supplied from the outside, or the like can be used.

The water supply line 131 is connected to the condenser 163. In the condenser 163, heat is exchanged between the gaseous medium M from the regenerator 161 and water from the water supply line 131 and thereby cools and condense the medium M while heating the water from the water supply line 131. The water heated by the condenser 163 is again sent to the low-pressure economizer 112*a* of the waste heat recovery boiler 110 via the water supply line 131.

The intake air cooling medium line 153 is connected to the evaporator 165. In the evaporator 165, heat is exchanged between the liquid medium M from the condenser 163 and the intake air cooling medium SM from the intake air cooling medium line 153 to heat and evaporate the liquid medium M while cooling the intake air cooling medium SM from the intake air cooling medium line 153. The intake air cooling medium SM cooled in the evaporator 165 is again sent to the intake air cooler 152 via the intake air cooling medium line 153.

The water supply line 131 is connected to the absorber 167. The absorbent liquid A regenerated by the regenerator 161 is introduced into the absorber 167. The gaseous medium M from the evaporator 165 also is introduced into the absorber 167. In the absorber 167, the gaseous medium M is absorbed into the regenerated absorbent liquid A. As a result, a pressure in the evaporator 165 decreases and evaporation of the liquid medium M in the evaporator 165 is promoted. Also, in the absorber 167, the absorbent liquid A is diluted by the medium M. The diluted absorbent liquid A is sent to the regenerator 161 and regenerated as described above. In the absorber 167, heat of dilution is generated when the absorbent liquid A is diluted by the medium M. The heat of dilution is recovered by water in the water supply line 131 passing through the absorber 167.

The intake air cooler 152 is provided in the intake air duct 9 of the gas turbine 10. In the intake air cooler 152, heat is exchanged between the air A passing through the intake air duct 9 and the intake air cooling medium SM in the intake air cooler 152 and thereby cools the air A passing through the intake air duct 9 while heating the intake air cooling medium SM. The heated intake air cooling medium SM is sent to the evaporator 165 via the intake air cooling medium line 153.

As the absorbent liquid A usable in the absorption refrigerating machine 160 of the present embodiment, for example, lithium bromide, ammonia, or the like is used. Also, as the medium M usable in the absorption refrigerating machine 160, water or the like is used. Also, as the intake air cooling medium SM, for example, water or the like is used. The absorbent liquid A, the medium M, and the intake air cooling medium SM are not limited to those described above, and can be appropriately changed depending on temperature conditions or the like.

Next, an operation of the gas turbine plant of the present embodiment will be described.

The compressor 11 of the gas turbine 10 compresses the air A and supplies the compressed air A to the combustor 21. In addition to the compressed air A, the fuel F is also supplied to the combustor 21. In the combustor 21, the fuel F is burned in the compressed air A and the combustion gas at high temperature and high pressure is generated. The combustion gas is sent from the combustor 21 to the combustion gas flow path in the turbine 31 to rotate the turbine rotor 33. The rotation of the turbine rotor 33 causes the power generator 41 connected to the gas turbine 10 to generate power.

The combustion gas which has rotated the turbine rotor 33 is exhausted from the gas turbine 10 as the exhaust gas EG and released to the atmosphere from the chimney 60 via the waste heat recovery boiler 110. The waste heat recovery boiler 110 recovers heat contained in the exhaust gas EG in the process in which the exhaust gas EG from the gas turbine 10 passes through the waste heat recovery boiler 110.

In the waste heat recovery boiler 110, water is supplied from the water supply line 131 to the low-pressure economizer 112*a* on the most downstream side (water supply process). In the low-pressure economizer 112*a*, heat is exchanged between the exhaust gas EG and the water flowing inside thereof to heat the water while cooling the exhaust gas EG. Some of the water heated by the low-pressure economizer 112*a* is further heated by the low-pressure evaporator 113*a* and becomes steam. This steam is further superheated by the low-pressure superheater 114*a* and is supplied to the low-pressure steam turbine 121*a* via the low-pressure steam line 132 as the low-pressure steam LS. The steam which has driven the low-pressure steam turbine 121*a* returns to water in the steam condenser 123. The water in the steam condenser 123 is pressurized by the water supply pump 124, passes through the water supply line 131 and the refrigerating machine 160, and returns to the low-pressure economizer 112*a* of the waste heat recovery boiler 110.

The other part of the water heated by the low-pressure economizer 112*a* is pressurized by the high-pressure pump 116*c*. The water pressurized by the high-pressure pump 116*c* is sent to the high-pressure economizer 112*c* via the low-pressure water branch line 117*c*.

The high-pressure economizer 112*c* heats the water sent from the high-pressure pump 116*c* by exchanging heat with the exhaust gas EG. The water heated by the high-pressure economizer 112*c* is further heated by the high-pressure evaporator 113*c* and becomes steam. This steam is further superheated by the high-pressure superheater 114*c* and becomes the high-pressure steam HS. The high-pressure steam HS is supplied to the high-pressure steam turbine 121*c* via the high-pressure steam line 138 to drive the high-pressure steam turbine 121*c*. The steam which has driven the high-pressure steam turbine 121*c* passes through the high-pressure steam recovery line 139 and the low-pressure steam line 132 and is supplied to the low-pressure steam turbine 121*a* to drive the low-pressure steam turbine 121a. The steam which has driven the low-pressure steam turbine 121a returns to water by the steam condenser 123 as described above.

In the gas turbine 10, as a mass flow rate of the gas flowing through the combustion gas flow path of the turbine 31 increases, output of the gas turbine is increased. In contrast, in summer or the like, when the outside air is at high temperature, a mass flow rate of the air A suctioned by the compressor 11 decreases, and as a result, the output of the gas turbine decreases. Therefore, in the present embodiment, the intake air cooler 152 is provided in the intake air duct 9 and the air suctioned by the compressor 11 is cooled by the intake air cooler 152. Specifically, in the present embodiment, when a temperature of the air A introduced into the intake air duct 9 is 30 to 35° C., for example, the temperature of the air A is lowered to about 12 to 17° C. by the intake air cooler 152.

In the intake air cooler 152, heat is exchanged between the air A passing through the intake air duct 9 and the intake air cooling medium SM in the intake air cooler 152 and thereby cools the air A passing through the intake air duct 9 while heating the intake air cooling medium SM. The heated intake air cooling medium SM is sent to the evaporator 165 of the refrigerating machine 160 via the intake air cooling medium line 153.

In the condenser 163 of the refrigerating machine 160, as described above, heat is exchanged between the gaseous medium M from the regenerator 161 and the water from the water supply line 131 and thereby cools and condense the medium M while heating the water from the water supply line 131. The water heated by the condenser 163 is again sent to the low-pressure economizer 112a of the waste heat recovery boiler 110 via the water supply line 131. Therefore, the water sent to the waste heat recovery boiler 110 is preheated by the condenser 163. Specifically, in the present embodiment, when a temperature of the water from the steam condenser 123 is at 30 to 35° C., for example, the temperature of the water increases to about 36 to 40° C. by the condenser 163. The medium M which has been condensed after heat is taken away by the heat exchange with the water from the water supply line 131 is introduced into the evaporator 165 of the refrigerating machine 160.

As described above, in the evaporator 165 of the refrigerating machine 160, heat is exchanged between the liquid medium M from the condenser 163 and the intake air cooling medium SM from the intake air cooling medium line 153 to heat and evaporate the liquid medium M while cooling the intake air cooling medium SM from the intake air cooling medium line 153. The intake air cooling medium SM cooled by the evaporator 165 is again sent to the intake air cooler 152 via the intake air cooling medium line 153. The medium M that absorbed heat and is evaporated by the heat exchange with the intake air cooling medium SM is introduced into the absorber 167 of the refrigerating machine 160 and is absorbed by the absorbent liquid A. The heat of dilution generated when the absorbent liquid A is absorbed into the medium M is recovered by the water in the water supply line 131 passing through the absorber 167.

As described above, in the present embodiment, the heat of the intake air cooling medium SM is transferred to the medium M by the evaporator 165 and cools the intake air cooling medium SM and the heat of the medium M is transferred to the water from the water supply line 131 by the condenser 163 to heat the water (heat pump cycle execution process). That is, in the present embodiment, heat transfer is performed between the water from the water supply line 131 and the intake air cooling medium SM via the medium M. Therefore, in the present embodiment, heat transfer is performed between the water from the water supply line 131 and the air A passing through the intake air duct 9 via the medium M of the refrigerating machine 160 and the intake air cooling medium SM.

Therefore, in the present embodiment, while cooling the air A suctioned by the gas turbine 10, it is possible to preheat the water sent to the waste heat recovery boiler 110 by utilizing the heat obtained by cooling the air A.

First Modified Example of the First Embodiment

Figure 3:
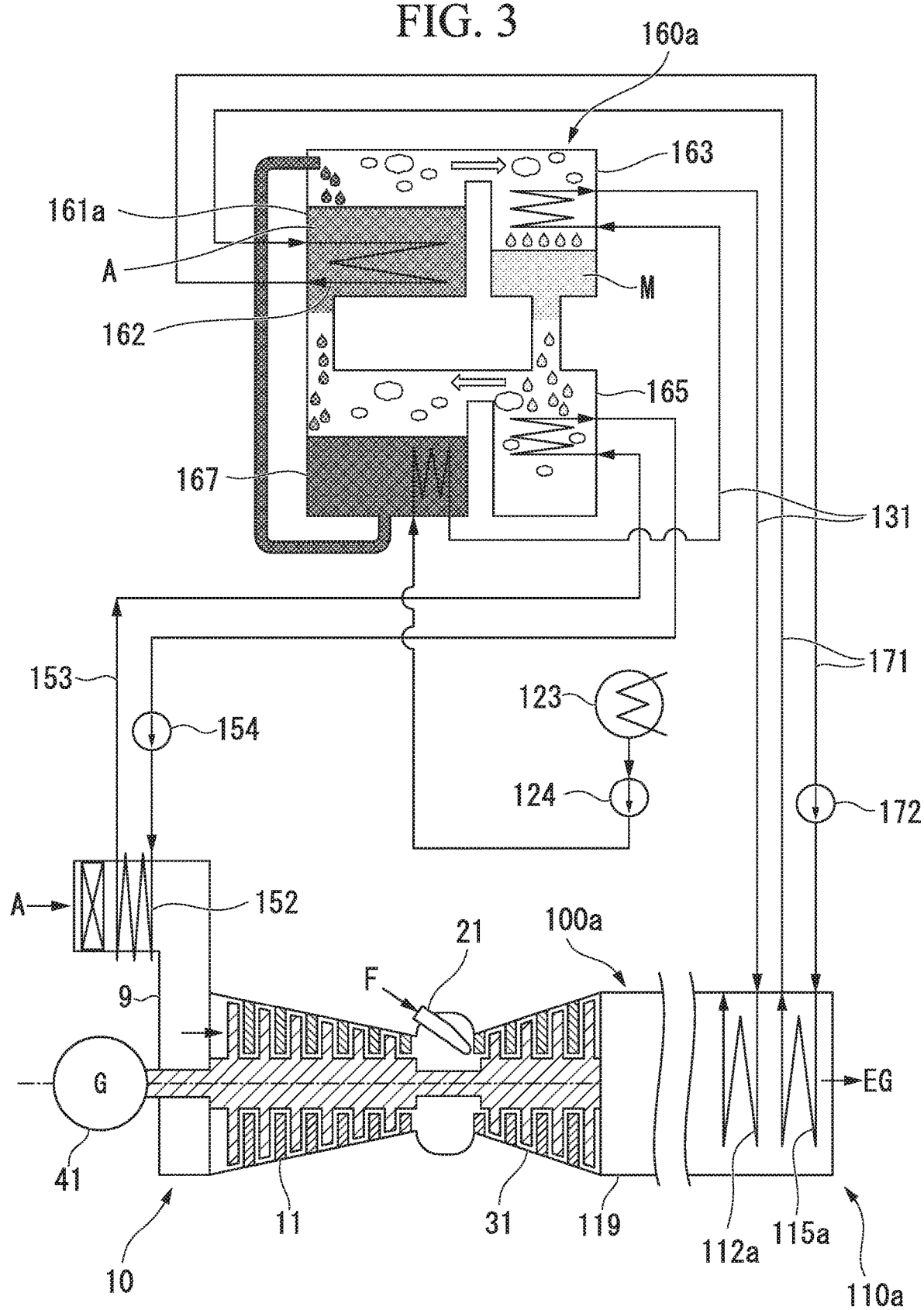
FIG. 3 is a main portion system diagram of a gas turbine plant in a first modified example of the first embodiment according to the present invention.

A first modified example of the first embodiment according to the present invention ill be described with reference to FIG. 3.

In the regenerator 161 of the absorption refrigerating machine 160 in the above-described first embodiment, the absorbent liquid A is heated using heat obtained by burning fuel of the gas turbine 10, the heat from a heat source medium such as high temperature water or high temperature steam supplied from the outside, or the like. In the present modified example, the absorbent liquid A is heated by utilizing waste heat from the gas turbine 10.

A waste heat recovery boiler 110a of a waste heat recovery facility 100a of the present modified example includes a low-temperature heat exchanger (a waste heat recovery heat exchanger) 115a disposed on the downstream side of the low-pressure economizer 112a in the boiler outer frame 119. The low-temperature heat exchanger 115a exchanges heat between the exhaust gas EG that has passed through the low-pressure economizer 112a and the absorbent liquid heating medium. Also, a regenerator 161a of an absorption refrigerating machine 160a of the present modified example includes an absorbent liquid heater 162 that exchanges heat between the absorbent liquid heating medium and the absorbent liquid A. The absorbent liquid heater 162 and the low-temperature heat exchanger 115a are connected by an absorbent liquid heating medium line 171. In the absorbent liquid heating medium line 171, a pump 172 for circulating the absorbent liquid heating medium in this line 171 is provided.

In the present modified example, the absorbent liquid heating medium is heated by exchanging heat between the exhaust gas EG and the absorbent liquid heating medium in the low-temperature heat exchanger 115a. The absorbent liquid heating medium is sent to the absorbent liquid heater 162 of the regenerator 161a via the absorbent liquid heating medium line 171. In the absorbent liquid heater 162, heat is exchanged between the absorbent liquid A in the regenerator 161a and the absorbent liquid heating medium to heat the absorbent liquid A in the regenerator 161a while cooling the absorbent liquid heating medium. When the absorbent liquid A is heated in the regenerator 161a and the temperature of the absorbent liquid A increases, the medium M contained in the absorbent liquid A evaporates. As a result, the absorbent liquid A that has been diluted with the medium M is regenerated into a denser absorbent liquid A in the regenerator 161a (regeneration process). On the other hand, the cooled absorbent liquid heating medium is sent to the low-temperature heat exchanger 115a via the absorbent liquid heating medium line 171. In the low-temperature heat exchanger 115a, as described above, the absorbent liquid heating medium is heated.

As described above, in the present modified example, the absorbent liquid A in the regenerator 161a is heated with the heat of the exhaust gas EG that has passed through the low-pressure economizer 112a. Therefore, in the present modification, it is possible to suppress the consumption of fuel or a heat source medium for heating the absorbent liquid A in the regenerator 161a.

In addition, in the present modified example, when the absorbent liquid A is insufficiently heated by the absorbent liquid heater 162, auxiliary heating with fuel or a heat source medium may be performed.

Second Modified Example of the First Embodiment

Figure 4:
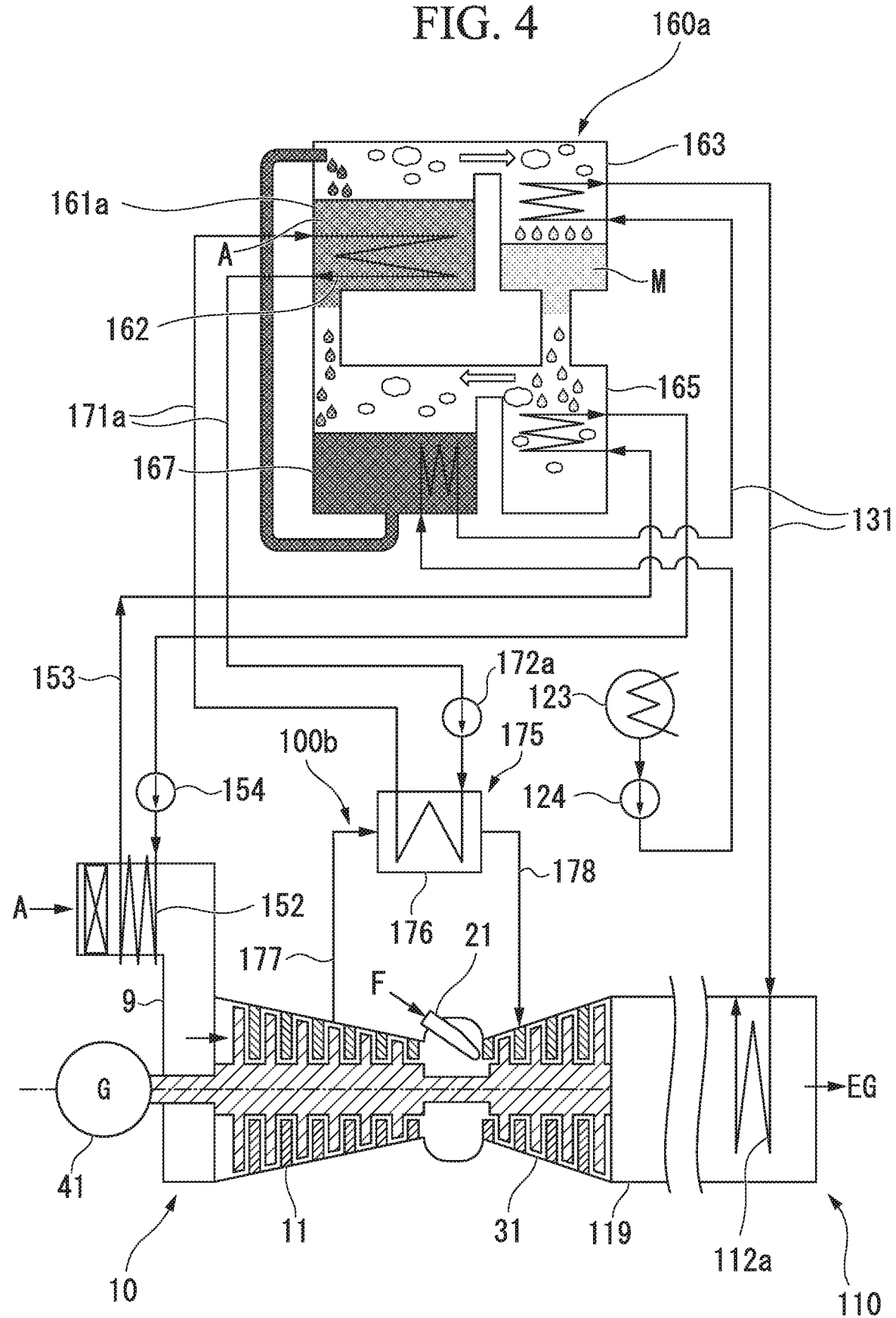
FIG. 4 is a main portion system diagram of a gas turbine plant in a second modified example of the first embodiment according to the present invention.

A second modified example of the first embodiment according to the present invention will be described with reference to FIG. 4.

As in the first modified example, the present modified example also uses the waste heat from the gas turbine 10 to heat the absorbent liquid A in the regenerator 161a of the absorption refrigerating machine 160a.

A gas turbine plant of the present modified example includes a component cooling device 175 which cools a high temperature component in contact with the combustion gas in the gas turbine 10 with air extracted from the compressor 11 of the gas turbine 10. The component cooling device 175 includes a compressed air cooler 176 which exchanges heat between the air A extracted from the compressor 11 of the gas turbine 10 and the absorbent liquid heating medium, an air extraction line 177 which guides the air A extracted from the compressor 11 to the compressed air cooler 176, and a cooling air line 178 which guides the air A cooled by the compressed air cooler 176 to the high temperature component of the gas turbine 10. As in the regenerator 161a of the first modified example, the regenerator 161a of the present modified example also has the absorbent liquid heater 162 which exchanges heat between the absorbent liquid heating medium and the absorbent liquid A. The absorbent liquid heater 162 and the compressed air cooler 176 are connected by an absorbent liquid heating medium line 171a. A pump 172a which pressurizes the absorbent liquid heating medium is provided in the absorbent liquid heating medium line 171a.

A waste heat recovery facility 100b of the present modified example includes the component cooling device 175 described above.

In the present modified example, heat is exchanged between the air A extracted from the compressor 11 and the absorbent liquid heating medium by the compressed air cooler 176. By this heat exchange, the air A is cooled while the absorbent liquid heating medium is heated (waste heat recovery process). The cooled air is sent to the high temperature component of the gas turbine 10 via the cooling air line 178. As the high temperature component, for example, there is a turbine vane 38, a turbine blade 35, or the like of the turbine 31. The absorbent liquid heating medium heated by the compressed air cooler 176 is sent to the absorbent liquid heater 162 of the regenerator 161a via the absorbent liquid heating medium line 171a. In the absorbent liquid heater 162, heat is exchanged between the absorbent liquid A in the regenerator 161a and the absorbent liquid heating medium to heat the absorbent liquid A in the regenerator 161a and regenerate the absorbent liquid. A as described above while cooling the absorbent liquid heating medium (regeneration process). The cooled absorbent liquid heating medium is sent to the compressed air cooler 176 via the absorbent liquid heating medium line 171a. In the compressed air cooler 176, as described above, the absorbent liquid heating medium is heated.

As described above, in the present modified example, the absorbent liquid A in the regenerator 161a is heated with the heat of the air extracted from the compressor 11. Therefore, also in the present modification, it is possible to suppress the consumption of fuel or a heat source medium for heating the absorbent liquid A in the regenerator 161a. Further, also in the present modified example, when the absorbent liquid A is insufficiently heated by the absorbent liquid heater 162, auxiliary heating with heat obtained by burning fuel of the gas turbine or with a heat source medium such as high temperature water or high temperature steam supplied from the outside may be performed.

Third Modified Example of the First Embodiment

A third modified example of the first embodiment according to the present invention will be described with reference to FIG. 5.

The refrigerating machine of the above-described embodiment is the absorption refrigerating machine 160. However, the refrigerating machine is not limited to the absorption refrigerating machine 160, and may be a compression refrigerating machine, for example.

Figure 5:
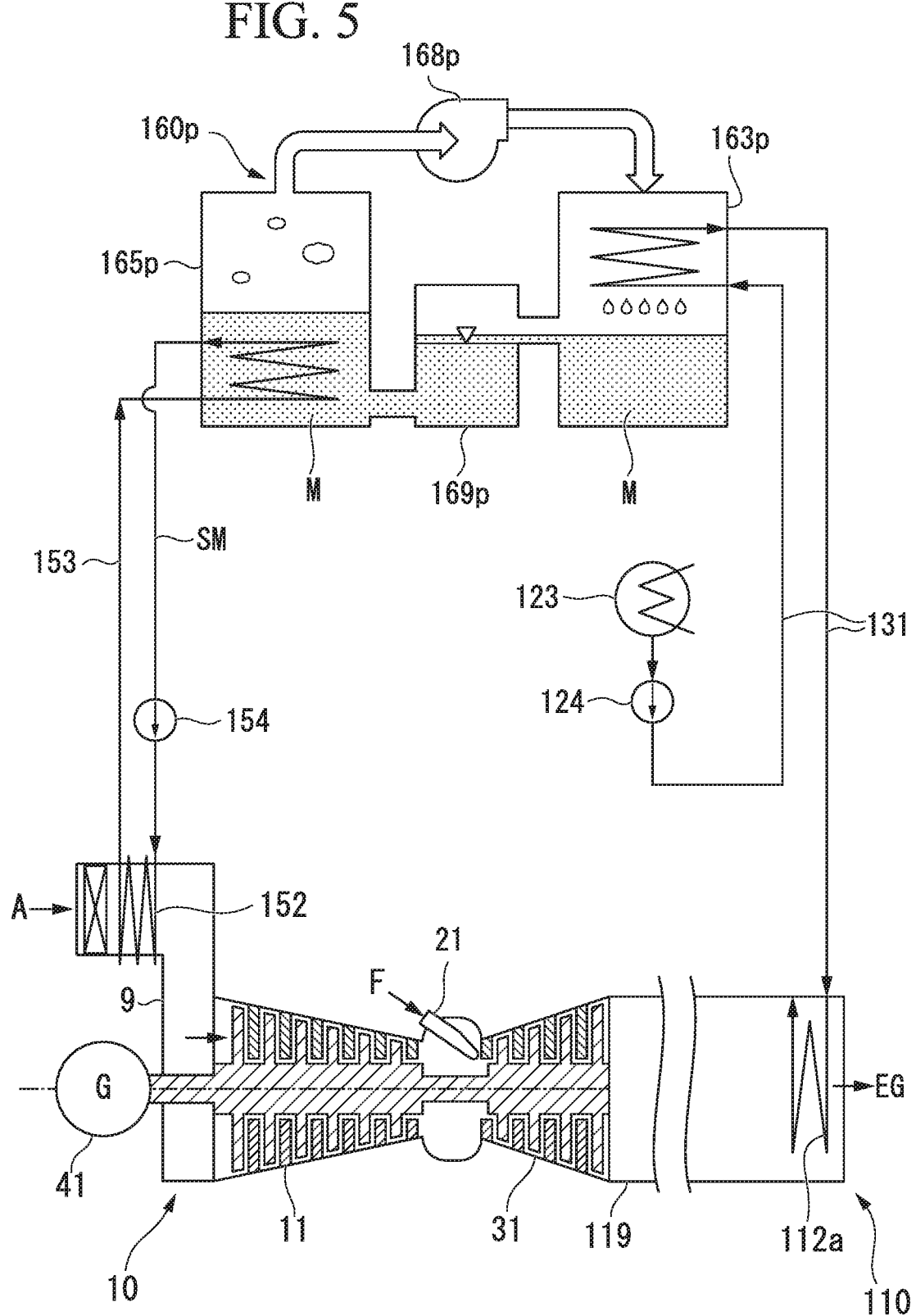
FIG. 5 is a main portion system diagram of a gas turbine plant in a third modified example of the first embodiment according to the present invention.

As shown in FIG. 5, a compression refrigerating machine 160p includes an evaporator 165p which evaporates the medium M, a compressor 168p which compresses the medium M vaporized in the evaporator 165p, a condenser 163p which condenses the gaseous medium M from the compressor 168p, and a decompressor 169p which decompresses the medium M condensed by the condenser 163p. Regarding the compression refrigerating machine 160p, one using a centrifugal compressor as the compressor 168p is referred to as a turbo refrigerating machine in some cases. In the compression refrigerating machine 160p of the present modified example, any type of compressor such as a reciprocating compressor or a rotary compressor may be used as the compressor 168p in addition to the centrifugal compressor.

The intake air cooling medium line 153 is connected to the evaporator 165p of the compression refrigerating machine 160p. In this evaporator 165p, heat is exchanged between the liquid medium M and the intake air cooling medium SM from the intake air cooling medium line 153 to heat and evaporate the liquid medium M while cooling the intake air cooling medium SM from the intake air cooling medium line 153. The intake air cooling medium SM cooled in the evaporator 165p is sent back to the intake air cooler 152 via the intake air cooling medium line 153.

The gaseous medium M is compressed by the compressor 168p and then sent to the condenser 163p.

The water supply line 131 is connected to the condenser 163p. In the condenser 163p, heat is exchanged between the gaseous medium M compressed by the compressor 168p and the water from the water supply line 131 and cools and condense the gaseous medium M while heating the water from the water supply line 131. The water heated by the condenser 163p is again sent to the low-pressure economizer 112a of the waste heat recovery boiler 110 via the water supply line 131.

In the decompressor 169p, the medium M condensed by the condenser 163p is decompressed. The decompressed liquid medium M is introduced into the evaporator 165p in which heat is exchanged with the intake air cooling medium SM from the intake air cooling medium line 153 as described above.

As described above, the refrigerating machine of the above-described embodiment may not be the absorption refrigerating machine 160, and may be the compression refrigerating machine 160p as in the present modified example, and further, may be another type of refrigerating machine such as an adsorption refrigerating machine, for example.

Second Embodiment of Gas Turbine Plant

Figure 6:
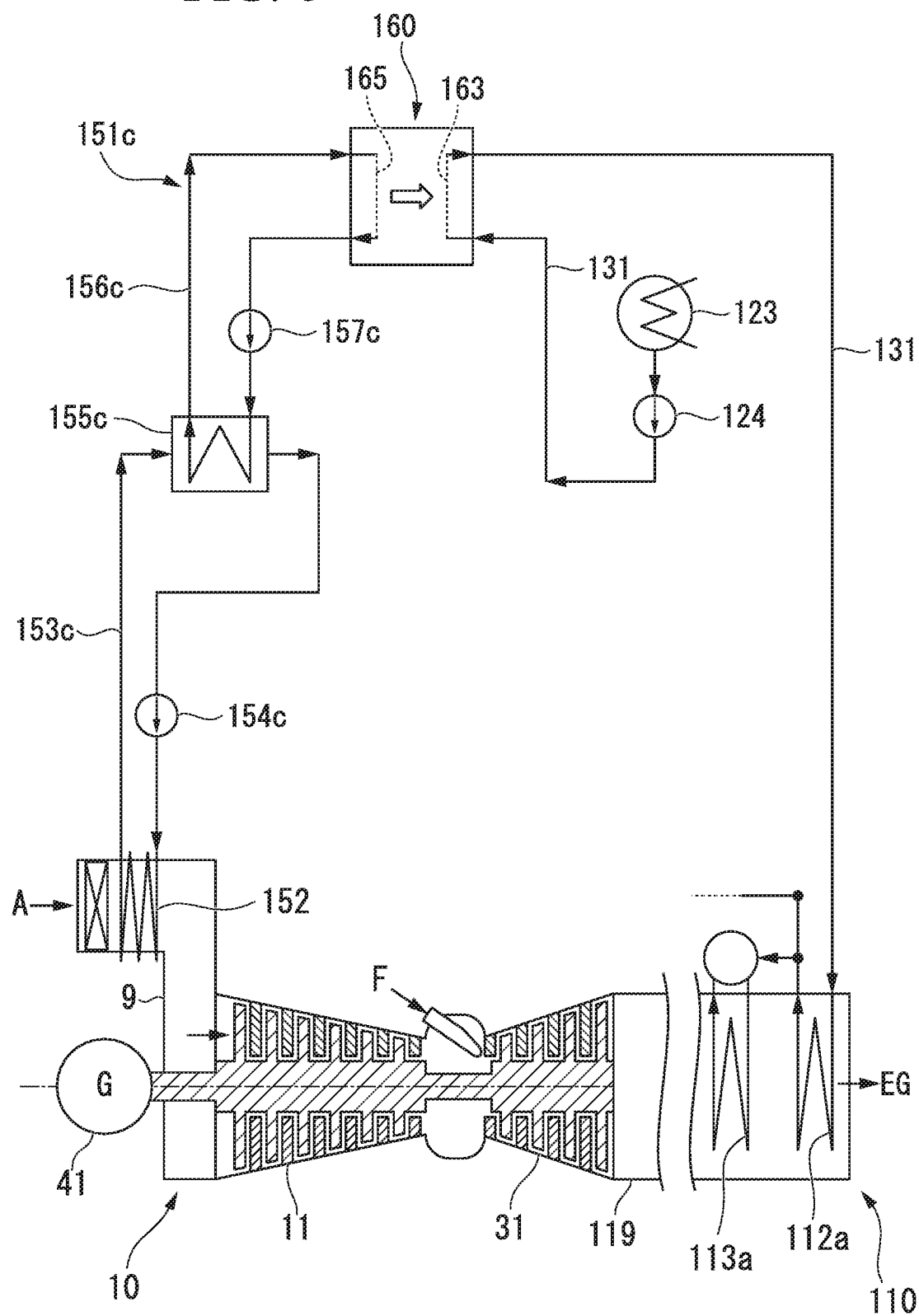
FIG. 6 is a main portion system diagram of a gas turbine plant in a second embodiment according to the present invention.

A second embodiment of the gas turbine plant according to the present invention will be described with reference to FIG. 6.

In the gas turbine plant of the present embodiment, the heat pump device is different from that of the above-described first embodiment, and other configurations are the same as those in the above-described first embodiment.

A heat pump device 151c of the present embodiment includes a refrigerating machine 160 which is one type of heat pump, an intermediate heat exchanger 155c, an intermediate medium line 156c, a circulation pump 157c, an intake air cooler 152, an intake air cooling medium line 153c, and a circulation pump 154c. The intermediate heat exchanger 155c exchanges heat between an intermediate medium cooled by the refrigerating machine 160 and an intake air cooling medium SM. The intermediate medium line 156c connects an evaporator 165 of the refrigerating machine 160 with the intermediate heat exchanger 155c. The circulation pump 157c circulates the intermediate medium in the intermediate medium line 156c. The intake air cooler 152 cools air A suctioned by a compressor with the intermediate medium. The intake air cooling medium line 153c connects the intake air cooler 152 and the intermediate heat exchanger 155c. The circulation pump 154c circulates the intake air cooling medium SM in the intake air cooling medium line 153c.

Also in the present embodiment, in the intake air cooler 152 provided in an intake air duct 9, heat is exchanged between the air A suctioned by a compressor 11 and the intake air cooling medium SM and thereby cools the air A while heating the intake air cooling medium SM. The heated intake air cooling medium SM exchanges heat with the intermediate medium in the intermediate heat exchanger 155c and is cooled. The intake air cooling medium SM cooled by the intermediate heat exchanger 155c is sent to the intake air cooler 152. On the other hand, the intermediate medium heated by heat exchange with the intake air cooling medium SM is sent to the evaporator 165 of the refrigerating machine 160 and is cooled in the evaporator 165. The intermediate medium cooled by the evaporator 165 of the refrigerating machine 160 returns to the intermediate heat exchanger 155c and thereby cools the intake air cooling medium SM.

In the first embodiment described above, the air A suctioned by the compressor 11 is directly cooled with the intake air cooling medium SM cooled by the refrigerating machine 160. However, as in the present embodiment, the intake air cooling medium SM may be cooled via the intermediate medium cooled by the refrigerating machine 160 and the air A suctioned by the compressor 11 may be cooled with the intake air cooling medium SM.

Third Embodiment of Gas Turbine Plant

Figure 7:
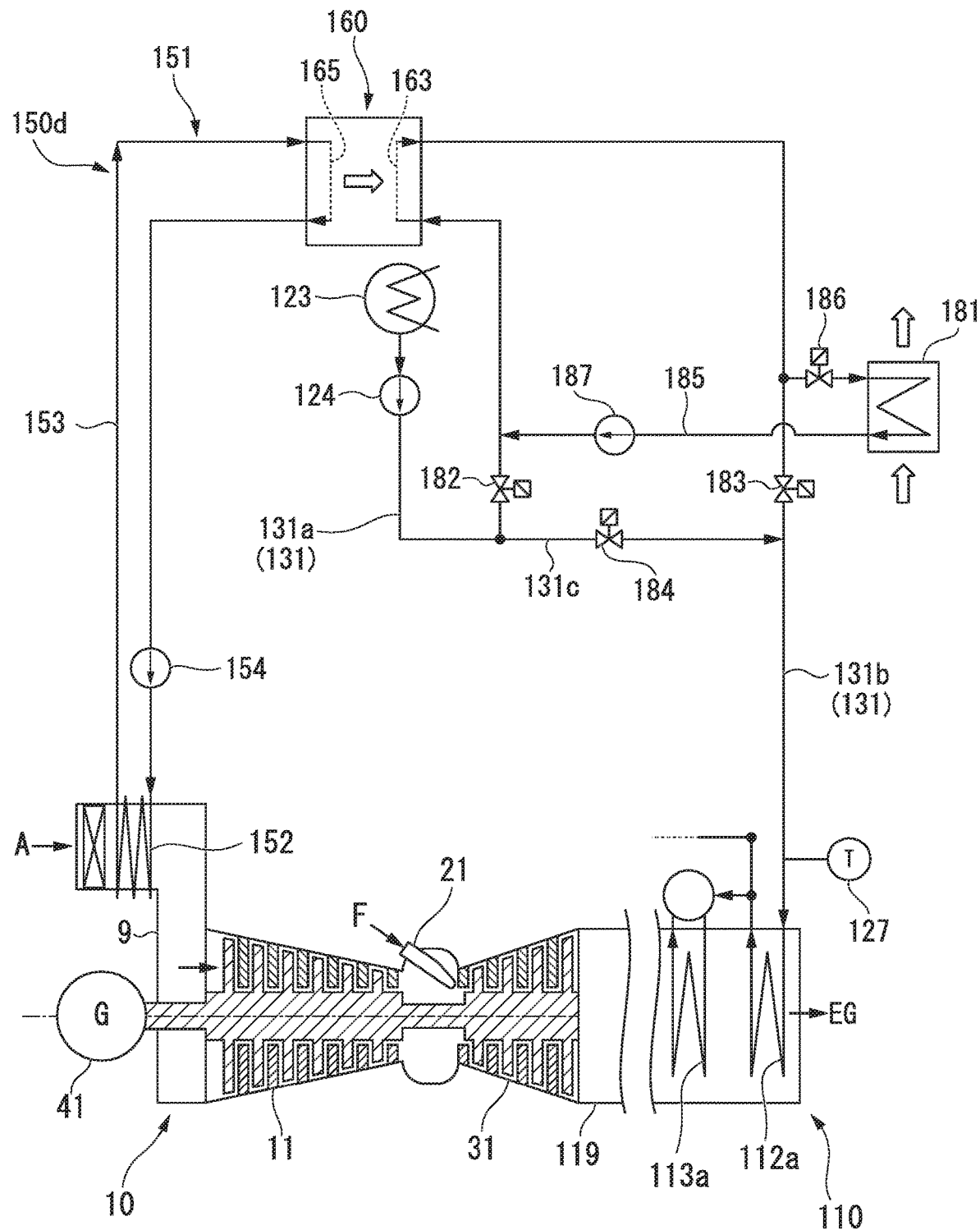
FIG. 7 is a main portion system diagram of a gas turbine plant in a third embodiment according to the present invention.

A third embodiment of the gas turbine plant according to the present invention will be described with reference to FIG. 7.

In the gas turbine plant of the present embodiment, the intake air cooling device is different from that of the above-described first embodiment, and other configurations are the same as those in the above-described first embodiment.

As in the first embodiment, an intake air cooling device 150d of the present embodiment includes a water supply line 131 and a heat pump device 151. The heat pump device 151 is the same as the heat pump device 151 of the first embodiment described above. The intake air cooling device 150d of the present embodiment further includes a supply water temperature adjuster 181 which takes heat away from water flowing through the water supply line 131.

The supply water temperature adjuster 181 is not limited and anything may be used as long as it takes heat away from the water flowing through the water supply line 131 to lower the temperature of the water. Thus, the supply water temperature adjuster 181 may be, for example, a heat exchanger which exchanges heat between water and a water cooling medium, a cooling tower, or a radiator which releases the heat of water to the atmosphere. When a heat exchanger is used as the supply water temperature adjuster 181, river water, seawater, groundwater, or the like may be used as the water cooling medium. Also, when a temperature condition is satisfied, fuel supplied to a combustor may be used as the water cooling medium and the fuel may be preheated by heat exchange between the water and the fuel.

The water supply line 131 includes a pre-preheating water supply line 131a which sends water from a steam condenser 123 to a refrigerating machine 160 of the heat pump device 151, and a preheated water supply line 131b which sends water preheated by the refrigerating machine 160 to a waste heat recovery boiler 110. The pre-preheating water supply line 131a and the preheated water supply line 131b are connected by a water supply bypass line 131c. A water supply pump 124 is provided on the steam condenser 123 side relative to a connection position with the water supply bypass line 131c, in the pre-preheating water supply line 131a.

A pre-preheating water supply adjusting valve 182 is provided on the refrigerating machine 160 side with respect to the connection position with the water supply bypass line 131c, in the pre-preheating water supply line 131a. Also, a preheated water supply adjusting valve 183 is provided on the refrigerating machine 160 side with respect to the connection position with the water supply bypass line 131c, in the preheated water supply line 131b. On the side of the waste heat recovery boiler 110 in the preheated water supply line 131b, a thermometer 127 for determining the temperature of water flowing therethrough is provided. A water supply bypass adjusting valve 184 is provided in the water supply bypass line 131c.

A position on the refrigerating machine 160 side with respect to the preheated water supply adjusting valve 183 in the preheated water supply line 131b and a position on the refrigerating machine 160 side with respect to the pre-preheating water supply adjusting valve 182 in the pre-preheating water supply line 131a are connected to a water supply temperature adjusting line 185. The supply water temperature adjuster 181 is provided in the water supply temperature adjusting line 185. Further, a temperature adjusting valve 186 and a return pump 187 are provided in the water supply temperature adjusting line 185.

In the first embodiment described above, the water sent to a low-pressure economizer 112a can be preheated by heating the water from the steam condenser 123 with the refrigerating machine 160. However, when a heating amount of water in the refrigerating machine 160 is large, it is conceivable that water in the low-pressure economizer 112a starts to boil before being introduced into a low-pressure evaporator 113a due to heat exchange between the preheated water and an exhaust gas EG. When water starts to boil before being introduced into the low-pressure evaporator 113a, problems such as an increase in pressure loss or the occurrence of a water hammer phenomenon arise. In addition, when the entire amount of waste heat of the refrigerating machine 160 is recovered, although an amount of temperature rise in the supply water increases and the waste heat at high temperature can be released to the water of the water supply line 131, a high-performance refrigerating machine 160 is required and the coefficient of performance of the refrigerating machine 160 decreases.

Therefore, in the present embodiment, the supply water temperature adjuster 181 which takes heat away from the water flowing in the preheated water supply line 131b is provided to lower the temperature of the water.

In the present embodiment, in an initial state, both the pre-preheating water supply adjusting valve 182 and the preheated water supply adjusting valve 183 are in an open state. Also, in the initial state, both the temperature adjusting valve 186 and the water supply bypass adjusting valve 184 are in a closed state. In this initial state, the water from the steam condenser 123 is sent to the refrigerating machine 160 via the pre-preheating water supply line 131a and is heated by the refrigerating machine 160. The water heated by the refrigerating machine 160 is sent to the low-pressure economizer 112a of the waste heat recovery boiler 110 via the preheated water supply line 131b.

When the temperature determined by the thermometer 127 provided in the preheated water supply line 131b is equal to or higher than a predetermined temperature the temperature adjusting valve 186 opens. As a result, some of the water flowing through the preheated water supply line 131b is introduced into the supply water temperature adjuster 181. Here, the predetermined temperature refers to, for example, a temperature lower than a value obtained by subtracting a temperature rise of water in the low-pressure economizer 112a from a saturation temperature at which water boils in the low-pressure economizer 112a. The supply water temperature adjuster 181 takes heat of the water to lower the temperature of the water (supply water temperature adjusting process). The water whose temperature has been lowered returns to the refrigerating machine 160 via the water supply temperature adjusting line 185 and the pre-preheating water supply line 131a. Therefore, in the present embodiment, the system including the refrigerating machine 160 and the supply water temperature adjuster 181 reduces an amount of heat applied to the water from the steam condenser 123 and thus can lower the temperature of the water sent to the low-pressure economizer 112a of the waste heat recovery boiler 110. As a result, it is possible to suppress the boiling of water in the low-pressure economizer 112a. Also, in the present embodiment, since some of the water circulates between the refrigerating machine 160 and the supply water temperature adjuster 181, a flow rate of the water flowing through the refrigerating machine 160 increases, an amount of temperature rise in the water of the refrigerating machine 160 can be decreased, and thereby a temperature of the water at an outlet of the refrigerating machine 160 can be decreased. Therefore, in the present embodiment, since the refrigerating machine 160 can release waste heat to low temperature water, a relatively inexpensive refrigerating machine 160 can be used and the coefficient of performance of the refrigerating machine 160 can be increased.

As described above, it is conceivable that, even when some of the water flowing through the preheated water supply line 131b is introduced into the supply water temperature adjuster 181, the temperature determined by the thermometer 127 provided in the preheated water supply line 131b may not be lower than the predetermined temperature. In this case, in the present embodiment, the water supply bypass adjusting valve 184 is opened while throttling the pre-preheating water supply adjusting valve 182 or preheated water supply adjusting valve 183. As a result, some of the water from the steam condenser 123 is introduced into the low-pressure economizer 112a via the water supply bypass line 131c without passing through the refrigerating machine 160. In some cases, the pre-preheating water supply adjusting valve 182 or the preheated water supply adjusting valve 183 is completely closed while the water supply bypass adjusting valve 184 is opened. As a result, all the water from the steam condenser 123 does not pass through the refrigerating machine 160 but is introduced into the low-pressure economizer 112a via the water supply bypass line 131c. Therefore, as described above, it is possible to further reduce an amount of heat applied to the water from the steam condenser 123 and reduce a temperature of the water sent to the low-pressure economizer 112a of the waste heat recovery boiler 110 by controlling each adjusting valve.

In addition, in the present embodiment, the water supply temperature adjusting line 185 which returns the water cooled by the supply water temperature adjuster 181 to the water supply line 131 may be connected to the steam condenser 123 side with respect to the connection position with the water supply bypass line 131c, in the pre-preheating water supply line 131a.

Fourth Embodiment of Gas Turbine Plant

Figure 8:
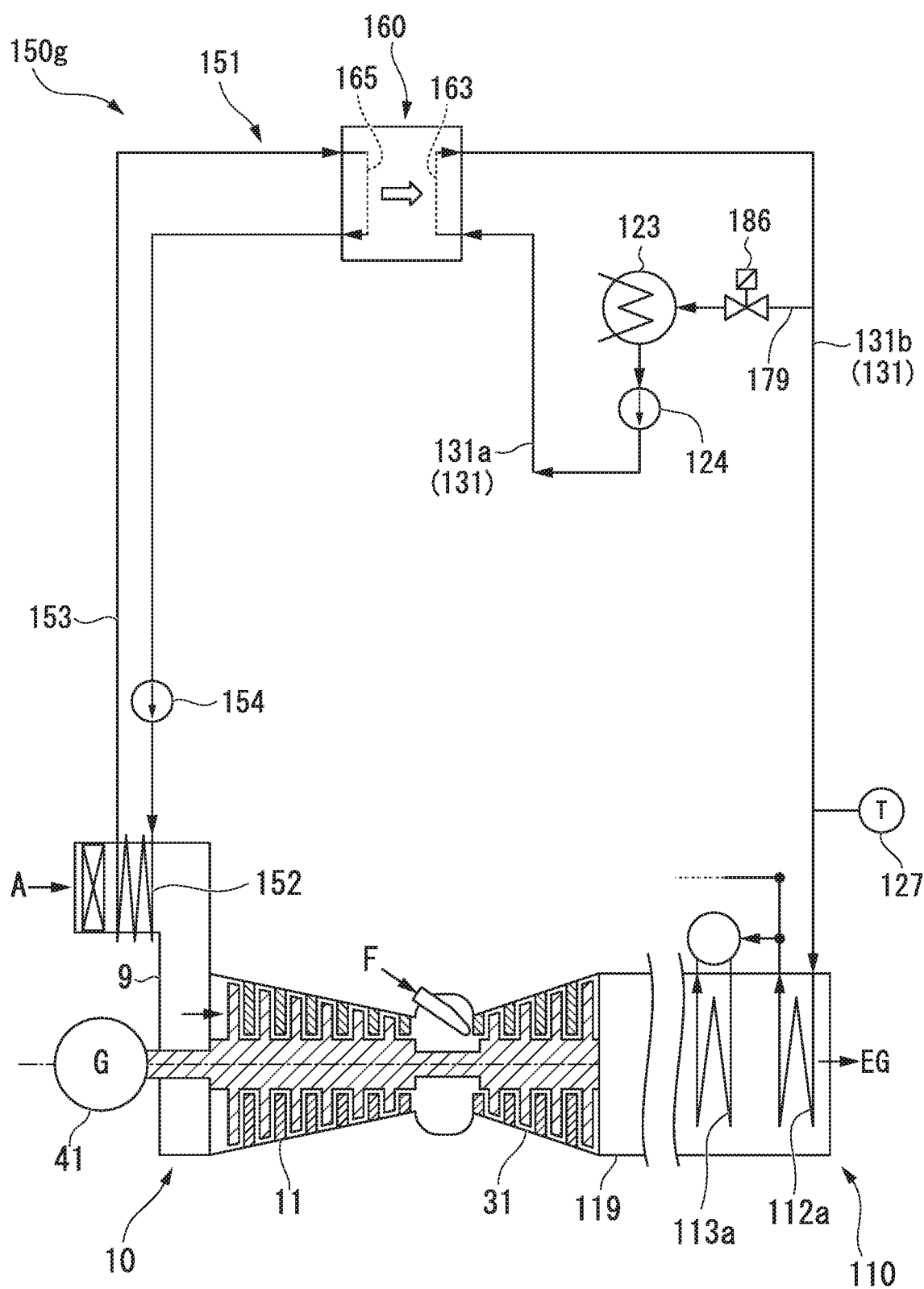
FIG. 8 is a main portion system diagram of a gas turbine plant in a fourth embodiment according to the present invention.

A fourth embodiment of the gas turbine plant according to the present invention will be described with reference to FIG. 8.

In the gas turbine plant of the present embodiment, the intake air cooling device is different from that of the above-described first embodiment, and other configurations are the same as those in the above-described first embodiment.

As in the above-described first embodiment, an intake air cooling device 150g of the present embodiment includes a water supply line 131 and a heat pump device 151. The heat pump device 151 is the same as the heat pump device 151 of the first embodiment described above. The intake air cooling device 150g of the present embodiment further includes a condensation return line 179 which returns preheated water which is the water flowing through the preheated water supply line 131b to a steam condenser 123. On the side of a waste heat recovery boiler 110 in the preheated water supply line 131b, a thermometer 127 for determining a temperature of the preheated water flowing therethrough is provided. A temperature adjusting valve 186 is provided in the condensation return line 179.

When the temperature determined by the thermometer 127 provided in the preheated water supply line 131b is equal to or higher than a predetermined temperature, the temperature adjusting valve 186 is opened. As a result, some of the preheated water flowing through the preheated water supply line 131b returns to the steam condenser 123 via the condensation return line 179 (condensation return process). Here, the predetermined temperature refers to, as shown in the third embodiment described above, for example, a temperature lower than a value obtained by subtracting a temperature rise of water in the low-pressure economizer 112a from a saturation temperature at which water boils in the low-pressure economizer 112a.

In the third embodiment described above, the supply water temperature adjuster 181 or the like is provided to lower the temperature of the preheated water. In the present embodiment, the function of the supply water temperature adjuster 181 is assigned to the steam condenser 123. That is, in the present embodiment, heat of the preheated water is taken away by the steam condenser 123 by returning the preheated water to the steam condenser 123. Thus, in the present embodiment, a temperature rise of the water heated by the heat pump device 151 is suppressed by increasing a flow rate of the water heated by the heat pump device 151. Therefore, also in the present embodiment, a temperature of the water sent to the low-pressure economizer 112a of the waste heat recovery boiler 110 can be lowered as in the third embodiment. As a result, boiling of water in the low-pressure economizer 112a can be suppressed. Also, in the present embodiment, it is not necessary to provide the supply water temperature adjuster 181, a return pump 187, or the like as in the third embodiment. Therefore, in the present embodiment, it is possible to simplify the configuration and reduce equipment cost as compared to the third embodiment described above.

Fifth Embodiment of Gas Turbine Plant

Figure 9:
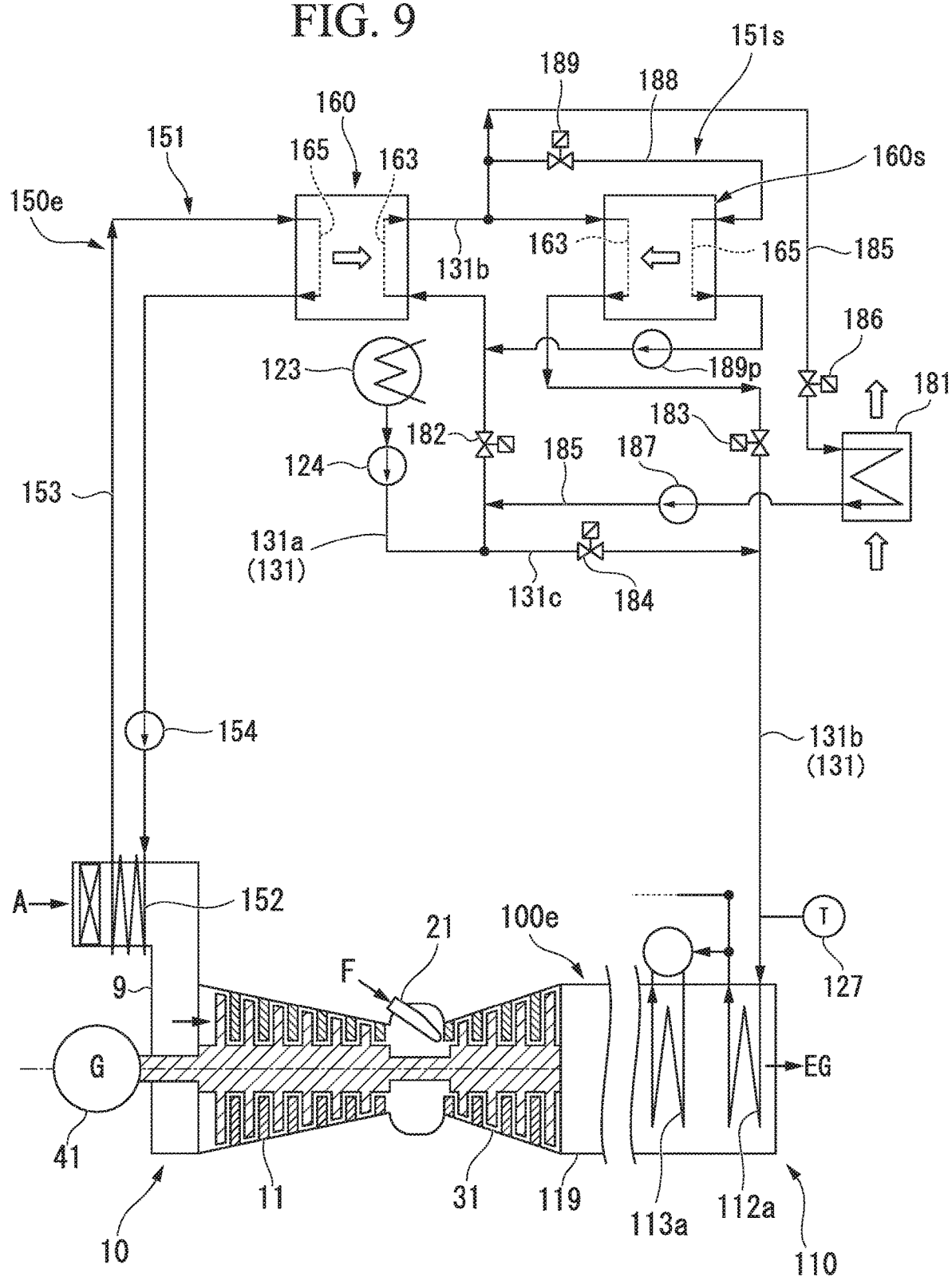
FIG. 9 is a main portion system diagram of a gas turbine plant in a fifth embodiment according to the present invention.

A fifth embodiment of the gas turbine plant according to the present invention will be described with reference to FIG. 9.

In the gas turbine plant of the present embodiment, a heat pump device 151s is added to the intake air cooling device 150d of the third embodiment described above and other configurations are the same as those in the third embodiment described above.

As in the third embodiment, an intake air cooling device 150e in a waste heat recovery facility 100e of the present embodiment includes a water supply line 131, a heat pump device 151 which cools air A suctioned by a compressor 11, a supply water temperature adjuster 181 which takes heat away from the water flowing through the water supply line 131. The intake air cooling device 150e of the present embodiment further includes the heat pump device 151s which further heats water heated by the cooling of the air A suctioned by the compressor 11. Here, for convenience of the following description, the heat pump device 151 which cools the air A suctioned by a compressor 11 is designated as a first heat pump device 151 and the heat pump device 151s which further heats the water heated by the first heat pump device 151 is designated as a second heat pump device 151s.

The second heat pump device 151s includes a water supply circulation line 188 and a refrigerating machine 160s. The returning water supply circulation line 188 is branched off from the preheated water supply line 131b and returns some of the water flowing through the preheated water supply line 131b to a pre-preheating water supply line 131a. The refrigerating machine 160s transfers heat of the water flowing through the water supply circulation line 188 to the water flowing through the preheated water supply line 131b for heating the water. Here, the refrigerating machine 160 of the first heat pump device 151 is designated as a first refrigerating machine 160 and this refrigerating machine 160s of the second heat pump device 151s is designated as a second refrigerating machine 160s.

Similar to the first refrigerating machine 160, the second refrigerating machine 160s is one type of heat pump and may be an absorption refrigerating machine, a compression refrigerating machine, an adsorption refrigerating machine, or the like. Each of these refrigerating machines has an evaporator which evaporates a liquid medium M and a condenser which condenses the medium M evaporated by the evaporator. Therefore, the second refrigerating machine 160s of the present embodiment also has an evaporator 165 and a condenser 163.

A portion on the side of a waste heat recovery boiler 110 with respect to a branched-off position of the water supply circulation line 188 in the preheated water supply line 131b is connected to the condenser 163 of the second refrigerating machine 160s. Therefore, some of the water heated by the condenser 163 of the first refrigerating machine 160 is further heated by the condenser 163 of the second refrigerating machine 160s and is sent to the waste heat recovery boiler 110 via the preheated water supply line 131b. Also, in the condenser 163 of the second refrigerating machine 160s, the medium M cooled by heat exchange with water is condensed.

The water supply circulation line 188 is connected to the evaporator 165 of the second refrigerating machine 160s. Therefore, some of the remaining water heated by the condenser 163 of the first refrigerating machine 160 is cooled by the evaporator 165 of the second refrigerating machine 160s and then returns to the condenser 163 of the first refrigerating machine 160 via the water supply circulation line 188. Also, in the evaporator 165 of the second refrigerating machine 160s, the medium M heated by heat exchange with water is evaporated.

As described above, in the second refrigerating machine 160s, the evaporator 165 of the second refrigerating machine 160s transfers heat of the water flowing through the water supply circulation line 188 to the medium M and thereby cools the water and the condenser 163 of the second refrigerating machine 160s transfers heat of the medium M to the water from the preheated water supply line 131b to heat the water (second heat pump cycle process). That is, in the second refrigerating machine 160s, heat transfer between the water from the water supply circulation line 188 and the water from the preheated water supply line 131b is performed via the medium M.

In the present embodiment, in the water supply circulation line 188, a water supply circulation amount adjusting valve 189 which adjusts a flow rate of water flowing therethrough is provided, in the present embodiment, since the flow rate of the water flowing through the water supply circulation line 188 is adjusted by the water supply circulation amount adjusting valve 189, an amount of heat transfer performed between the water from the water supply circulation line 188 and the water from the preheated water supply line 131b is adjusted.

Further, although the intake air cooling device 150e of the present embodiment has the supply water temperature adjuster 181 as does the intake air cooling device 150d of the third embodiment described above, this supply water temperature adjuster 181 may be omitted when there is no concern of water being boiled in a low-pressure economizer 112a. However, since the intake air cooling device 150e of the present embodiment has the second heat pump device 151s which further heats the water heated by the first heat pump device 151 in addition to the first heat pump device 151 which heats water from the steam condenser 123, basically, it is preferable that the supply water temperature adjuster 181 is provided. In addition, instead of the supply water temperature adjuster 181, the condensation return line 179 and the temperature adjusting valve 186 in the above-described fourth embodiment may be provided.

Sixth Embodiment of Gas Turbine Plant

Figure 10:
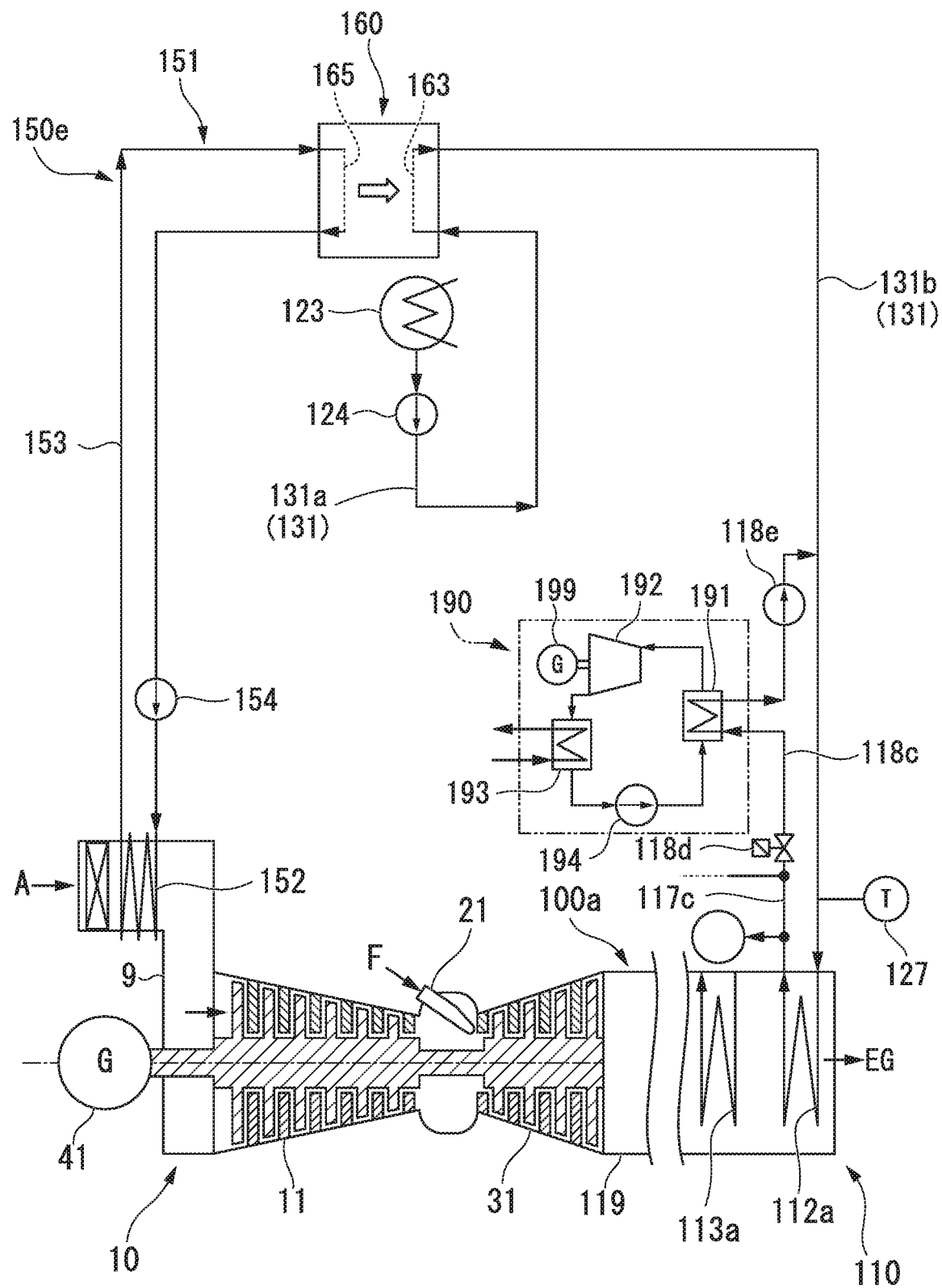
FIG. 10 is a main portion system diagram of a gas turbine plant in a sixth embodiment according to the present invention.

A sixth embodiment of the gas turbine plant according to the present invention will be described with reference to FIG. 10.

In the gas turbine plant of the present embodiment, a low boiling point medium Rankine cycle 190 is added to the waste heat recovery facility 100 of the first embodiment described above and other configurations are the same as those in the first embodiment described above.

The Rankine cycle is a cycle for driving a turbine with steam. On the other hand, the low boiling point medium Rankine cycle 190 is a cycle in which a turbine 192 is driven using a medium having a boiling point lower than that of water (hereinafter referred to as a low boiling point medium).

Examples of the low boiling point medium include the following substances.

Organic halogen compounds such as trichloroethylene, tetrachloroethylene, monochlorobenzene, dichlorobenzene, and perfluorodecalin.

Alkanes such as butane, propane, pentane, hexane, heptane, octane, and decane.

Cyclic alkanes such as cyclopentane and cyclohexane.

Thiophene, Ketones, Aromatic compounds

Refrigerants such as R134a and R245fa.

Combination of the above.

The low boiling point medium Rankine cycle 190 includes an evaporator (a heater) 191, the turbine 192, a condenser 193, a low boiling point medium pump 194, and a low boiling point medium line 197. The evaporator 191 heats and evaporates a liquid low boiling point medium. The turbine 192 is driven with the evaporated low boiling point medium. The condenser 193 cools and condenses the low boiling point medium which has driven the turbine 192. The low boiling point medium pump 194 returns the condensed low boiling point medium to the evaporator 191. The low boiling point medium line 197 is a line for flowing the low boiling point medium between the above elements. To the turbine 192, for example, a power generator 199 which generates power by the driving of the turbine 192 is connected. The condenser 193 is one type of heat exchanger and exchanges heat between the low boiling point medium and a cooling medium such as water. Also, the evaporator (heater) 191 is also one type of heat exchanger and exchanges heat between the liquid low boiling point medium and water heated by a waste heat recovery boiler 110.

A low-pressure water branch line 117c of the waste heat recovery boiler 110 is branched off halfway. This branch line is connected to a preheated water supply line 131b as a hot water line 118c. This hot water line 118c is connected to the evaporator 191 of the low boiling point medium Rankine cycle 190. Specifically, a heating water inlet of the evaporator 191 is connected to the low-pressure economizer 112a side of the hot water line 118c and a heating water outlet of the evaporator 191 is connected to the preheated water supply line 131b side of the hot water line 118c. The hot water line 118c is provided with a hot water flow rate adjusting valve 118d which adjusts a flow rate of water flowing therethrough and a hot water pump 118e which pressurizes the water flowing through the hot water line 118c. In addition, a thermometer 127 for determining a temperature of water flowing therethrough is provided, at a position on the waste heat recovery boiler 110 side with respect to a connection position with the hot water line 118c, in the preheated water supply line 131b.

In the present embodiment, in an initial state, the hot water flow rate adjusting valve 118d is in a closed state. Thus, in this initial state, the low boiling point medium Rankine cycle and the hot water pump 118e are not driven. In this initial state, the water from the steam condenser 123 is sent to a refrigerating machine 160 via a pre-preheating water supply line 131a and is heated in the refrigerating machine 160. The water heated by the refrigerating machine 160 is sent to the low-pressure economizer 112a of the waste heat recovery boiler 110 via the preheated water supply line 131b.

When a temperature of the thermometer 127 provided in the preheated water supply line 131b is equal to or higher than a predetermined temperature, the hot water flow rate adjusting valve 118d is opened, and the low boiling point medium Rankine cycle and the hot water pump 118e start to be driven.

When the hot water flow rate adjusting valve 118d is opened, some of the water heated by the low-pressure economizer 112a is supplied to the evaporator 191 of the low boiling point medium Rankine cycle 190 via the hot water line 118c.

In the evaporator 191, heat is exchanged between the liquid low boiling point medium and the water heated by the low-pressure economizer 112a, and the liquid low boiling point medium is heated and evaporated (heating process). In this process, the water is cooled and flows out from the heating water outlet of the evaporator 191. The water flowed out from the heating water outlet of the evaporator 191 is introduced into the preheated water supply line 131b via the hot water line 118c. This water mixes with the water from the refrigerating machine 160, flows through the preheated water supply line 131b, and returns to the low-pressure economizer 112a (water recovery process).

The low boiling point medium evaporated by the evaporator 191 drives the turbine 192 which is a component of the low boiling point medium Rankine cycle 190. The low boiling point medium which has driven the turbine 192 is sent to the condenser 193. In the condenser 193, heat is exchanged between the low boiling point medium and the cooling medium, and the low boiling point medium is cooled and condensed. The condensed low boiling point medium is sent to the evaporator 191 by the low boiling point medium pump 194 and, as described above, exchanges heat with water in the evaporator 191. As described above, the low boiling point medium circulates in the low boiling point medium Rankine cycle 190 (Rankine cycle execution process).

As described above, in the present embodiment, the system having the low boiling point medium Rankine cycle 190 and the low-pressure economizer 112a can reduce an amount of heat applied to the water from the refrigerating machine 160 and reduce a temperature of the water sent to the low-pressure economizer 112a of the waste heat recovery boiler 110. As a result, boiling of the water in the low-pressure economizer 112 can be suppressed. Further, in the present embodiment, extra heat among the heat contained in the water heated by the refrigerating machine 160 can be utilized for driving the low boiling point medium Rankine cycle 190 and thereby the output and efficiency of the plant can be increased.

Seventh Embodiment of Gas Turbine Plant

Figure 11:
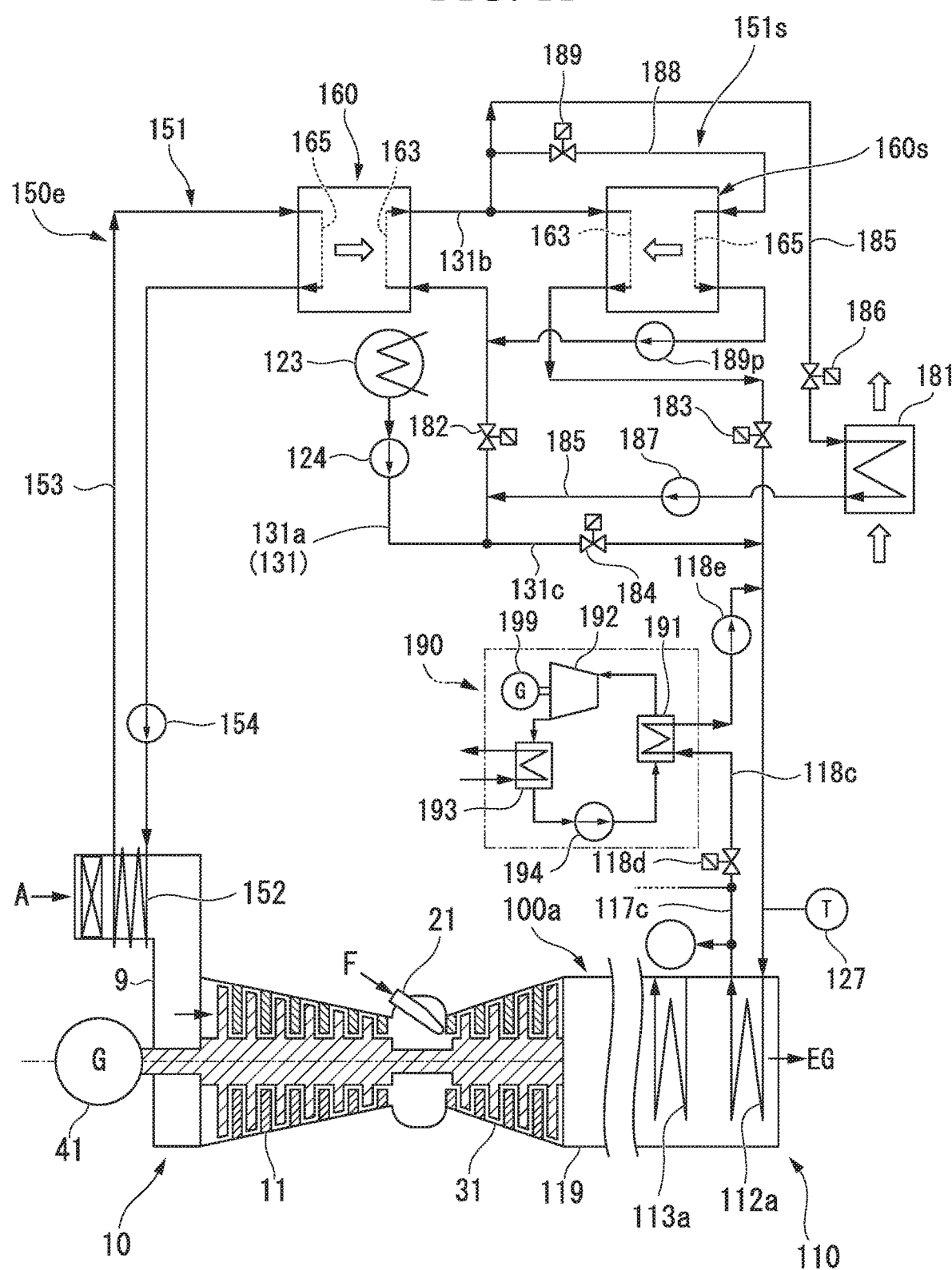
FIG. 11 is a main portion system diagram of a gas turbine plant in a seventh embodiment according to the present invention.

A seventh embodiment of the gas turbine plant according to the present invention be described with reference to FIG. 11.

In the gas turbine plant of the present embodiment, the low boiling point medium Rankine cycle 190 described in the sixth embodiment is added to the waste heat recovery facility 100e of the above-described fifth embodiment, and other configurations are the same as those in the fifth embodiment described above.

A low-pressure water branch line 117c of a waste heat recovery boiler 110 is branched off halfway as in the sixth embodiment. This branched line is connected to a preheated water supply line 131b as a hot water line 118c. As in the sixth embodiment, this hot water line 118c is connected to an evaporator 191 of the low boiling point medium Rankine cycle 190. The hot water line 118c is provided with a hot water flow rate adjusting valve 118d which adjusts a flow rate of water flowing therethrough and a hot water pump 118e which pressurizes the water flowing through the hot water line 118c. In addition, at a position, on the waste heat recovery boiler 110 side with respect to a connection position with the hot water line 118c, in the preheated water supply line 131b, a thermometer 127 for determining the temperature of water flowing therethrough is provided.

In the present embodiment, in an initial state, both a pre-preheating water supply adjusting valve 182 and a preheated water supply adjusting valve 183 are in open state. Also, in this initial state, both a temperature adjusting valve 186 and a water supply bypass adjusting valve 184 are in closed state. Further, in this initial state, the hot water flow rate adjusting valve 118d is in a closed state as in the sixth embodiment. Therefore, in the initial state, the low boiling point medium Rankine cycle 190 and the hot water pump 118e are not driven. In the initial state, the water from the steam condenser 123 is sent to a first refrigerating machine 160 via a pre-preheating water supply line 131a and is heated in the first refrigerating machine 160. The water heated by the first refrigerating machine 160 is sent to a second refrigerating machine 160s via the preheated water supply line 131b and is further heated by the second refrigerating machine 160s. The water heated by the second refrigerating machine 160s is sent to a low-pressure economizer 112a of the waste heat recovery boiler 110 via the preheated water supply line 131b.

When a temperature of the thermometer 127 provided in the preheated water supply line 131b is equal to or higher than a predetermined temperature, the hot water flow rate adjusting valve 118d is opened and the low boiling point medium Rankine cycle 190 and the hot water pump 118e start to be driven.

When the hot water flow rate adjusting valve 118d is opened, some of the water heated by the low-pressure economizer 112a is supplied to the evaporator 191 of the low boiling point medium Rankine cycle 190 via the hot water line 118c (heating water introduction process).

In the evaporator 191, as in the sixth embodiment, heat is exchanged between a liquid low boiling point medium and the water heated by the low-pressure economizer 112a, and the liquid low boiling point medium is heated and evaporated (heating process). In this process, the water is cooled and then introduced into the preheated water supply line 131b via the hot water line 118c. This water mixes with the water from the second refrigerating machine 160s, flows through the preheated water supply line 131b, and returns to the low-pressure economizer 112a (water recovery process).

The low boiling point medium evaporated by the evaporator 191 of the low boiling point medium Rankine cycle 190 drives a turbine 192 of the low boiling point medium Rankine cycle 190. The low boiling point medium which has driven the turbine 192 is sent to a condenser 193 in which it is condensed. The condensed low boiling point medium is sent to the evaporator 191 by a low boiling point medium pump 194 and, as described above, exchanges heat with water in the evaporator 191. As described above, the low boiling point medium circulates in the low boiling point medium Rankine cycle 190 (Rankine cycle execution process).

As in the sixth embodiment described above, also in the present embodiment, the system having the low boiling point medium Rankine cycle 190 and the low-pressure economizer 112a can reduce an amount of heat applied to the water from the second refrigerating machine 160s and reduce a temperature of the water sent to the low-pressure economizer 112a of the waste heat recovery boiler 110. As a result, evaporation of water in the low-pressure economizer 112a can be suppressed. Also in the present embodiment, extra heat among the heat contained in the water heated by the first refrigerating machine 160 and the second refrigerating machine 160s can be utilized for driving the low boiling point medium Rankine cycle 190 and thus an output and efficiency of the plant can be increased.

Here, it is conceivable that, even when some of the water heated by the low-pressure economizer 112a is introduced into the low boiling point medium Rankine cycle 190, a temperature of the thermometer 127 provided in the preheated water supply line 131b may not be lower than the predetermined temperature. In this case, in the present embodiment, the temperature adjusting valve 186 is opened and some of the water flowing through the preheated water supply line 131b is introduced into a supply water temperature adjuster 181. The supply water temperature adjuster 181 takes heat of the water to lower a temperature of the water. The water whose temperature has been lowered returns to the first refrigerating machine 160 via a water supply temperature adjusting line 185 and a pre-preheating water supply line 131a. Therefore, in the present embodiment, the system having the first refrigerating machine 160, the second refrigerating machine 160s, and the supply water temperature adjuster 181 can reduce an amount of heat applied to the water from the steam condenser 123 and reduce a temperature of the water sent to the low-pressure economizer 112a of the waste heat recovery boiler 110.

In addition, also in the present embodiment, as described in the third embodiment, the water supply temperature adjusting line 185 which returns the water cooled by the supply water temperature adjuster 181 to a water supply line 131 may be connected to the steam condenser 123 side with respect to a connection position with a water supply bypass line 131c, in the pre-preheating water supply line 131a.

In the present embodiment, since the low boiling point medium Rankine cycle 190 is provided, the supply water temperature adjuster 181 may be omitted when there is no concern of water being boiled in the low-pressure economizer 112a. Also in the present embodiment, instead of the supply water temperature adjuster 181, the condensation return line 179 and the temperature adjusting valve 186 in the above-described fourth embodiment may be provided.

Also, the low boiling point medium Rankine cycle 190 described in the present embodiment and the fifth embodiment is an example of a basic aspect of the low boiling point medium Rankine cycle, and other aspects of the low boiling point medium Rankine cycle may be employed as the low boiling point medium Rankine cycle 190 of these embodiments. For example, a preheater which exchanges heat between the low boiling point medium condensed by the condenser 193 and the low boiling point medium which has driven the turbine 192 to heat the condensed low boiling point medium may be added to the low boiling point medium Rankine cycle 190 of the embodiments described above. Further, a plurality of evaporators 191 may be connected in series or in parallel to the condenser 193, and a turbine 192 may be provided for each of the plurality of evaporators 191.

Other Modified Examples

Each of the refrigerating machine 160 in the second embodiment, third embodiment, and fifth embodiment, and the first refrigerating machine 160 in the fourth embodiment and sixth embodiment is the same as the refrigerating machine 160 of the first embodiment serving as an absorption refrigerating machine. However, the refrigerating machine 160 in these embodiments may also be another type of refrigerating machine such as a compression refrigerating machine 160p or an adsorption refrigerating machine.

In addition, when any one of the refrigerating machine 160 in the second embodiment, third embodiment, fourth embodiment, and sixth embodiment, and the first refrigerating machine 160 and the second refrigerating machine 160s in the fifth embodiment and seventh embodiment is the absorption refrigerating machine, as described in the first modified example and the second modified example, the absorbent liquid A may be heated utilizing the waste heat from the gas turbine 10 in the regenerator 161 of the absorption refrigerating machine.

In the second embodiment, the intermediate heat exchanger 155c is added to the heat pump device 151 of the first embodiment. As in the second embodiment, the intermediate heat exchanger 155c may also be added to the heat pump device 151 in the third embodiment, fourth embodiment, and sixth embodiment, and the first heat pump device 151 in the fifth embodiment and seventh embodiment.

In addition, all the waste heat recovery facilities in the gas turbine plant of each of the embodiments described above include the steam turbines 121a and 121c. However, the waste heat recovery facility may include only the waste heat recovery boiler 110 and a device utilizing the steam generated by the waste heat recovery boiler 110, and may not include a steam turbine.

INDUSTRIAL APPLICABILITY

According to one aspect of the present invention, while cooling air suctioned by a gas turbine, it is possible to efficiently utilize heat obtained by cooling the air.

REFERENCE SIGNS LIST

3 Gas turbine rotor
7 Gas turbine casing
9 Intake air duct
10 Gas turbine
11 Compressor
21 Combustor
31 Turbine
41 Power generator
100, 100a, 100b, 100e Waste heat recovery facility
110, 110a Waste heat recovery boiler
111a Low-pressure steam generator
111c High-pressure steam generator
112a Low-pressure economizer
113a Low-pressure evaporator
113a, 114a Low-pressure superheater
115a Low-temperature heat exchanger (waste heat recovery heat exchanger)
117 Low-pressure water line
117c Low-pressure water branch line
118c Hot water line
118d Hot water flow rate adjusting valve
118e Hot water pump
119 Boiler outer frame
119e Exhaust port
123 Steam condenser
124 Water supply pump
127 Thermometer
131 Water supply line
131a Pre-preheating water supply line
131b Preheated water supply line
131c Water supply bypass line
132 Low-pressure steam line
138 High-pressure steam line
139 High-pressure steam recovery line
150, 150d, 150e, 150g Intake air cooling device
151, 151c Heat pump device (first heat pump device)
151s Second heat pump device
152 intake air cooler
153, 153c Intake air cooling medium line
154, 154c Circulation pump
155c Intermediate heat exchanger
156c Intermediate medium line
157c Circulation pump
160, 160a Absorption refrigerating machine (refrigerating machine, first refrigerating machine)
160p Compression refrigerating machine (refrigerating machine)
160s Second refrigerating machine (refrigerating machine)
161, 161a Regenerator
162 Absorbent liquid heater
163, 163p Condenser
165, 165p Evaporator
167 Absorber
168p Compressor
169p Decompressor
171, 171a Absorbent liquid heating medium line
175 Component cooling device
176 Compressed air cooler (waste heat recovery heat exchanger)
177 Air extraction line
178 Cooling air line
179 Condensation return line
181 Supply water temperature adjuster
185 Water supply temperature adjusting line
188 Water supply circulation line
190 Low boiling point medium Rankine cycle
191 Evaporator (heater)
192 Turbine
193 Condenser
194 Low boiling point medium pump

The invention claimed is:

1. An intake air cooling device comprising:
a water supply line which is configured to send water to a waste heat recovery boiler which is configured to convert the water into steam using heat of an exhaust gas exhausted from a gas turbine;
a heat pump device which is configured to transfer heat of air suctioned by the gas turbine to water flowing through the water supply line and thereby cool the air while heating the water; and a supply water temperature adjusting device, which is configured to lower a temperature of preheated water which is water flowing through a preheated water supply line on a waste heat recovery boiler side with respect to the heat pump device, in the water supply line, wherein the supply water temperature adjusting device includes:

a supply water temperature adjuster which is configured to take heat away from the preheated water;

a water supply temperature adjusting line which is configured to guide the preheated water to the supply water temperature adjuster and return the preheated water from which heat has been taken away by the supply water temperature adjuster to any place in the water supply line;

a thermometer which is configured to determine a temperature of the water flowing through the preheated water supply line; and a temperature adjusting valve which is configured to flow water from the preheated water supply line to the water supply temperature adjusting line when the temperature of the water determined by the thermometer is equal to or higher than a predetermined temperature, wherein the predetermined temperature refers to a temperature lower than a value obtained by subtracting a temperature rise of water in the waste heat recovery boiler from a saturation temperature at which water boils in the waste heat recovery boiler.

2. The intake air cooling device according to claim 1, wherein:

the heat pump device is a first heat pump device; and the intake air cooling device further comprises a second heat pump device which is configured to further heat the water flowing through the preheated water supply line on the waste heat recovery boiler side with respect to the first heat pump device.

3. The intake air cooling device according to claim 1, wherein the heat pump device includes:

an intake air cooler which is configured to exchange heat between the air and an intake air cooling medium and thereby cool the air while heating the intake air cooling medium;

an intermediate heat exchanger which is configured to exchange heat between the intake air cooling medium heated by the intake air cooler and an intermediate medium and thereby cool the intake air cooling medium while heating the intermediate medium; and a heat pump which is configured to transfer heat of the intermediate medium heated by the intermediate heat exchanger to the water flowing through the water supply line and thereby cool the intermediate medium while heating the water.

4. A waste heat recovery facility comprising:

the intake air cooling device according to claim 1; and the waste heat recovery boiler.

5. The waste heat recovery facility according to claim 4, wherein the waste heat recovery boiler includes:

a boiler outer frame through which the exhaust gas is to flow toward a downstream side which is an exhaust port side;

one or more evaporators having at least a portion thereof installed in the boiler outer frame and configured to heat water with the exhaust gas and generate steam; and an economizer which is an evaporator installed on the downstream side of the most downstream evaporator of the one or more evaporators in the boiler outer frame and configured to heat water introduced from the water supply line and sent to the most downstream evaporator of the one or more evaporators with the exhaust gas.

6. The waste heat recovery facility according to claim 5, further comprising:

a low boiling point medium Rankine cycle in which a low boiling point medium is to circulate repeatedly between condensation and evaporation, wherein the low boiling point medium Rankine cycle includes a heater which is configured to exchange heat between the low boiling point medium and some of the water heated by the economizer to heat the low boiling point medium.

7. The waste heat recovery facility according to claim 6, further comprising:

a hot water line which is configured to return some of the water heated by the economizer to the water supply line, wherein the heater of the low boiling point medium Rankine cycle is connected to the hot water line.

8. The waste heat recovery facility according to claim 5, further comprising:

a waste heat recovery heat exchanger which is configured to recover waste heat from the gas turbine to heat an absorbent liquid heating medium; and an absorbent liquid heating medium line which is configured to guide the absorbent liquid heating medium heated by the waste heat recovery heat exchanger to the heat pump device, wherein:

the heat pump device includes an absorption refrigerating machine having a regenerator which is configured to evaporate a medium contained in an absorbent liquid; and the absorbent liquid heating medium line is connected to the absorption refrigerating machine to exchange heat between the absorbent liquid heating medium and the absorbent liquid flowing in the absorption refrigerating machine.

9. The waste heat recovery facility according to claim 8, wherein the waste heat recovery heat exchanger is installed on the downstream side of the economizer in the boiler outer frame and configured to serve as a low-temperature heat exchanger which is configured to exchange heat between the absorbent liquid heating medium and the exhaust gas having passed through the economizer to heat the absorbent liquid heating medium.

10. The waste heat recovery facility according to claim 8, wherein the waste heat recovery heat exchanger is configured to serve as a compressed air cooler which is configured to exchange heat between air compressed by a compressor of the gas turbine and the absorbent liquid heating medium and thereby cool the air while heating the absorbent liquid heating medium.

11. A gas turbine plant comprising:

the waste heat recovery facility according to claim 4; and the gas turbine.

12. An intake air cooling method comprising:

a water supply process of sending water to a waste heat recovery boiler which converts the water into steam using heat of an exhaust gas exhausted from a gas turbine;

a heat pump cycle execution process of transferring heat of air suctioned by the gas turbine to the water sent to the waste heat recovery boiler in the water supply process and thereby cooling the air while heating the water; and a supply water temperature adjusting process of lowering a temperature of preheated water which is the water heated by execution of the heat pump cycle execution process and which is to be sent to the waste heat recovery boiler, when the temperature of the preheated water is equal to or higher than a predetermined temperature, wherein the predetermined temperature refers to a temperature lower than a value obtained by subtracting a temperature rise of water in the waste heat recovery boiler from a saturation temperature at which water boils in the waste heat recovery boiler.

13. The intake air cooling method according to claim 12, wherein, in the supply water temperature adjusting process, heat of the preheated water is taken away.

14. The intake air cooling method according to claim 12, wherein the supply water temperature adjusting process includes a condensation return process of returning a part of the preheated water to a steam condenser which returns steam generated by the waste heat recovery boiler to water, when the temperature of the preheated water is equal to or higher than the predetermined temperature.

15. The intake air cooling method according to claim 12, wherein:
the heat pump cycle execution process is a first heat pump cycle execution process; and
the intake air cooling method further comprises a second heat pump cycle execution process of further heating the water heated by execution of the first heat pump cycle execution process.

16. The intake air cooling method according to claim 12, further comprising a Rankine cycle execution process of circulating a low boiling point medium with a low boiling point medium Rankine cycle,
wherein the waste heat recovery boiler includes:

a boiler outer frame through which the exhaust gas flows toward a downstream side which is an exhaust port side;
one or more evaporators having at least a portion thereof installed in the boiler outer frame and configured to heat water with the exhaust gas and generate steam; and
an economizer which is an evaporator installed on the downstream side of the most downstream evaporator of the one or more evaporators in the boiler outer frame and configured to heat water sent to the most downstream evaporator of the one or more evaporators with the exhaust gas; and
wherein the Rankine cycle execution process includes a heating process of exchanging heat between some of the water heated by the economizer and the low boiling point medium to heat the low boiling point medium.

17. The intake air cooling method according to claim 16, further comprising a water recovery process of returning water cooled by heat exchange with the low boiling point medium in the heating process to the economizer.

18. The intake air cooling method according to claim 12, further comprising a waste heat recovery process of recovering waste heat from the gas turbine to heat an absorbent liquid heating medium,
wherein:
the heat pump cycle execution process is executed by an absorption refrigerating machine which includes a regenerator evaporating a medium contained in an absorbent liquid; and
the heat pump cycle execution process includes a regeneration process of exchanging heat between the absorbent liquid heating medium and the absorbent liquid flowing in the absorption refrigerating machine and thereby cooling the absorbent liquid heating medium while heating the absorbent liquid.

* * * * *